United States Patent
Battat et al.

(10) Patent No.: US 8,621,032 B2
(45) Date of Patent: Dec. 31, 2013

(54) METHOD AND APPARATUS FOR INTUITIVELY ADMINISTERING NETWORKED COMPUTER SYSTEMS

(75) Inventors: Reuven Battat, Stony Brook, NY (US); Michael Her, St. James, NY (US); Chandrasekhar Sundaresh, Nassau City, NY (US); Anders Vinberg, Kirkland, WA (US); Sidney Wang, Nesconset, NY (US)

(73) Assignee: CA, Inc., Islandia, NY (US)

( * ) Notice: Subject to any disclaimer, the term of this patent is extended or adjusted under 35 U.S.C. 154(b) by 1940 days.

(21) Appl. No.: 11/327,227

(22) Filed: Jan. 6, 2006
(Under 37 CFR 1.47)

(65) Prior Publication Data

US 2007/0033279 A1      Feb. 8, 2007

Related U.S. Application Data

(63) Continuation of application No. 11/054,887, filed on Feb. 9, 2005, now abandoned, which is a continuation of application No. 10/837,923, filed on May 3, 2004, now abandoned, which is a continuation of application No. 10/614,939, filed on Jul. 8, 2003, now abandoned, which is a continuation of application No. 09/545,024, filed on Apr. 7, 2000, now abandoned, which is a continuation-in-part of application No. 09/408,213, filed on Sep. 27, 1999, now Pat. No. 6,289,380, which is a continuation of application No. 08/892,919, filed on Jul. 15, 1997, now Pat. No. 5,958,012.

(60) Provisional application No. 60/021,980, filed on Jul. 18, 1996.

(51) Int. Cl.
    *G06F 15/16*     (2006.01)

(52) U.S. Cl.
    USPC .......................................................... 709/217

(58) Field of Classification Search
    USPC ................................ 709/223; 707/3; 715/800
    See application file for complete search history.

(56) References Cited

U.S. PATENT DOCUMENTS

| 5,261,044 A | 11/1993 | Dev et al. ....................... 715/855 |
| 5,276,789 A | 1/1994 | Besaw et al. ................... 345/440 |

(Continued)

FOREIGN PATENT DOCUMENTS

| EP | 608099 A1 * | 7/1994 | |
| EP | 0 777 357 | 6/1997 | .............. H04L 12/24 |

(Continued)

OTHER PUBLICATIONS

Robert G., et al., *Information Visualization Using 3D Interactive Animation*, The Next Generation GUIs, Communications of the ACM, vol. 36, No. 4, pp. 57-71, Apr. 1993.

(Continued)

*Primary Examiner* — Sulaiman Nooristany
(74) *Attorney, Agent, or Firm* — Baker Botts, L.L.P.

(57) ABSTRACT

A method and apparatus intuitively to administer all components of a networked computer system by use of real multidimensional views of any component or any set of components, including components related to a specific business interest, and with customizable and fully extensible functionality, across heterogenous platforms and applications. Navigation and configuration tools are provided, with an intelligent cursor, to travel to and address any component part thereof, or subset of components, with status and abnormalities identified, monitored and controlled, and by hierarchical filtration, and aggregation correlation with asynchronous notification. Graphical presentation tools are also provided employing an enhanced zooming graphical display.

16 Claims, 31 Drawing Sheets

(56) References Cited

U.S. PATENT DOCUMENTS

| | | | | |
|---|---|---|---|---|
| 5,295,244 | A | 3/1994 | Dev et al. | 715/853 |
| 5,353,399 | A | 10/1994 | Kuwamoto et al. | 715/736 |
| 5,394,522 | A | 2/1995 | Sanchez-Frank et al. | 715/735 |
| 5,437,009 | A | 7/1995 | Lane | |
| 5,500,934 | A | 3/1996 | Austin et al. | 715/853 |
| 5,509,123 | A | 4/1996 | Dobbins et al. | 709/243 |
| 5,535,403 | A | 7/1996 | Li et al. | 715/853 |
| 5,586,254 | A | 12/1996 | Kondo et al. | 714/25 |
| 5,586,255 | A | 12/1996 | Tanaka et al. | 709/223 |
| 5,623,590 | A | 4/1997 | Becker | |
| 5,682,487 | A | 10/1997 | Thomson | 715/800 |
| 5,684,969 | A * | 11/1997 | Ishida | 715/800 |
| 5,696,486 | A | 12/1997 | Poliquin et al. | 340/506 |
| 5,751,965 | A | 5/1998 | Mayo et al. | 709/224 |
| 5,768,501 | A | 6/1998 | Lewis | 714/48 |
| 5,774,669 | A | 6/1998 | George et al. | 709/224 |
| 5,787,252 | A | 7/1998 | Schettler et al. | 709/224 |
| 5,793,974 | A | 8/1998 | Messinger | 709/224 |
| 5,796,951 | A | 8/1998 | Hamner et al. | 709/223 |
| 5,801,707 | A | 9/1998 | Rolnik et al. | 715/853 |
| 5,802,383 | A | 9/1998 | Li et al. | 345/420 |
| 5,805,819 | A | 9/1998 | Chin et al. | 709/224 |
| 5,809,265 | A | 9/1998 | Blair et al. | 715/764 |
| 5,812,750 | A | 9/1998 | Dev et al. | 714/4 |
| 5,832,503 | A | 11/1998 | Malik et al. | 709/223 |
| 5,845,124 | A * | 12/1998 | Berman | 703/2 |
| 5,845,277 | A * | 12/1998 | Pfeil et al. | 1/1 |
| 5,880,729 | A | 3/1999 | Johnston, Jr. et al. | 715/823 |
| 5,956,028 | A | 9/1999 | Matsui et al. | 715/757 |
| 5,958,012 | A | 9/1999 | Battat et al. | 709/224 |
| 6,085,256 | A | 7/2000 | Kitano et al. | 719/315 |
| 6,154,212 | A | 11/2000 | Eick et al. | 715/848 |
| 6,225,999 | B1 | 5/2001 | Jain et al. | 715/734 |
| 6,259,679 | B1 | 7/2001 | Henderson et al. | 370/254 |
| 6,271,845 | B1 | 8/2001 | Richardson | 715/764 |
| 6,346,938 | B1 | 2/2002 | Chan et al. | 345/419 |
| 6,392,667 | B1 * | 5/2002 | McKinnon et al. | 715/738 |
| 6,414,677 | B1 | 7/2002 | Robertson et al. | 345/419 |
| 6,437,799 | B1 | 8/2002 | Shinomi | 345/666 |
| 6,476,831 | B1 | 11/2002 | Wirth et al. | 715/784 |
| 6,628,304 | B2 | 9/2003 | Mitchell et al. | 715/734 |
| 6,714,200 | B1 * | 3/2004 | Talnykin et al. | 345/473 |

FOREIGN PATENT DOCUMENTS

| | | | |
|---|---|---|---|
| EP | 0 883 067 | 12/1998 | G06F 17/00 |
| EP | 1 054 390 A2 | 11/2000 | G10L 15/26 |
| WO | WO 95/31774 | 11/1995 | G06F 9/44 |
| WO | WO 98/00954 | 1/1998 | H04L 29/06 |

OTHER PUBLICATIONS

Bederson, B., et al, Pad++:*A Zoomable Graphical Interface System*, CHI'95 Proceedings, ACM, 4 pages, May 1995.

Stafford, J., *Client-Server's Missing Link*, Article 1, VARbusiness, vol. 12, No. 2, 6 pages, Feb. 1, 1996.

Lamm, S., et al., *Real-Time Geographic Visualization of World Wide Web Traffic*, Fifth International World Wide Web Conference, Paris, France, 17 pages, May 1996.

Schaffer, D., et al., *Navigating Hierarchically Clustered Networks Through Fisheye and Full-Zoom Methods*, ACM Transactions on Computer-Human Interaction, vol. 3, No. 2, pp. 162-188, Jun. 1996.

Shneiderman, B., *The Eyes Have It: A Task by Data Type Taxonomy for Information Visualizations*, T.R. 96-66, Institute for Systems Research, 9 pages, Sep. 1996.

EPO Communication Pursuant to 94(3), regarding Application No. 00 928 570.1-2211, 8 pages, Dec. 21, 2007.

EPO Communication Pursuant to Article 94(3) regarding Application No. 02 715 024.2-1225; 6 pages, Sep. 14, 2010.

EPO Summons to attend oral proceedings Pursuant to Rule 115(1) EPC, regarding Application No. 00928570.1-2211, 7 pages, Oct. 2, 2010.

Communication from EPO regarding Application No. 00 928 570.1 (25 pages), Nov. 29, 2010.

* cited by examiner

METHOD AND APPARATUS FOR INTUITIVELY ADMINISTERING NETWORKED COMPUTER SYSTEMS

CROSS REFERENCE TO RELATED APPLICATIONS

This application is a continuation of U.S. application Ser. No. 11/054,887, filed Feb. 9, 2005, now abandoned, which is a continuation of U.S. application Ser. No. 10/837,923 filed May 3, 2004, now abandoned, which is a continuation of U.S. application Ser. No. 10/614,939 filed Jul. 8, 2003, now abandoned, which is a continuation of U.S. application Ser. No. 09/545,024 filed Apr. 7, 2000, now abandoned, which is a continuation in part of U.S. application Ser. No. 09/408,213 filed Sep. 27, 1999, now U.S. Pat. No. 6,289,380 B1, which is a continuation of U.S. application Ser. No. 08/892,919 filed Jul. 15, 1997, now U.S. Pat. No. 5,958,012 A, which claims benefit of U.S. Application Ser. No. 60/021,980 filed Jul. 18, 1996, each of which is incorporated herein by reference.

STATEMENT AS TO RIGHTS TO INVENTION MADE UNDER FEDERALLY SPONSORED RESEARCH AND DEVELOPMENT, IF ANY

This patent is not based upon any federally sponsored research and development.

BACKGROUND OF INVENTION

A. Field of Invention

The present invention is in the field of systems and articles of manufacture to administer complex, heterogeneous networked computer systems.

B. Related Background Art

Prior art systems were deficient generally for two reasons: first, limitations inherent in available user interfaces, and second, absence of open-architecture, integrated systems effectively to manage and administer heterogeneous platforms using diverse operating systems for many different applications, including information technology and business management administration and to isolate views of specific business and management interests.

Prior art graphical user interfaces of administrative systems attempted to administer multi-unit computer networks by causing any of the four categories of information to appear on the computer monitor being used by the system administrator.

1. Lists, two-dimensional and on scrollable screens, typically using a windows program manager with many sublists showing printers, operating systems, physical sights, etc.

2. Tree diagrams showing the hierarchical relationships of the network system such as by showing the various geographical locations, the number of buildings at a location, the number of computers at each location, and the peripheral equipment associated with each computer and the systems being operated on each computer.

3. A hierarchical structure using folders and icons with each folder being a list of icons and with each icon by its color indicating the status of each unit.

4. Diagrams, with icons, of the various systems in a hierarchy.

Each of the displayed categories of information works well but with critical limitations. For example, the use of two dimensional lists is definitely limited by the number of units: as the number increases, the lists become effectively unmanageable by the user. Further, the hierarchical systems can allow increased navigating ability but are again limited to a few thousand devices and by the fact that the only relationships that can be displayed are those within the hierarchy. This is limited typically because the tree structure is based on a single hierarchy; for example, it may be organized geographically and this will not allow display of units in multiple geographical locations that are a part of a particular business interest. The hierarchical systems also have the shortcoming that limited status-indicating information may be displayed in the available space. Even when using the folders-icon system, although multiple hierarchies can be displayed, the user tends to be confused or is provided incomplete information by the limited amount of data that can be provided. Managing the user interface itself becomes a bigger concern than managing the computer network. Although through certain enhancements, the tree diagram/map system can improve on its effectiveness, such as by showing a transmission line as green if it is functioning and red if it is not, it and the other prior art interface systems are still limited to several thousand units.

In the case of all of the aforementioned prior art systems discussed above, none can be effectively used in the modern environment in which it is not uncommon to have 10,000 computer devices to more than 100,000 such devices in a networked system. Further, the prior art systems limit the scope of the responsibility of the systems administrator. As the number of units within a network system increases, the number of physical and logical relationships between the systems responsible for the various functions increases exponentially so it becomes very difficult, if not impossible, to manage the network system. Even trained professionals cannot deal with the enormous numbers of relationships that must be monitored and managed in the complex systems. With prior art systems administration interfaces, panel design, PF keys, and screen clutter prohibit the intuitive navigation that enables effective systems and enterprise management.

The second broad category of deficiencies in the prior art relate to the absence of manageable systems for networks comprised of widely diverse hardware platforms and even more widely diverse software systems and specific application programs. For some time, as computer networks became more complex, systems administrators have needed the ability to have a view of the network that identifies and presents for viewing the units or assets that function in support of a particular application, and also to have the ability to apply systems management functions (asset utilization, alarms, software distribution, etc.) to manage the particular application. Prior to the present invention, a systems administrator would have to set up different systems for different platforms and applications: e.g., an administrator may need to set up Sun NetManager or Open-View or IBM's NetView to run LANs, then set up a different set of systems management tools for each of the other platforms in a user's enterprise—e.g., a system to track activities on AS/400s; another administration system may be needed for a UNIX host and server systems (and something different for each different UNIX OS, if there is more than one in a user's network). Further, mainframe systems tools for security, backup, scheduling, etc.; plus software distribution tools, desktop asset management tools, help desk and trouble-ticketing tools all had to be separately provided, and their compatibility constantly was problematic.

In the prior art, there has not been a system or apparatus that, on a single console, effectively and in combination:

1. Uses 3-D virtual reality to map complex systems—business or Information Technology—to an intuitive and effective interface;

2. Maps systems management tasks to business functions, not to system hardware or software;
3. Achieves end-to-end comprehensive integrated systems and network management of all elements of an IT network from a single or several points of control;
4. Allows business process management of financial, manufacturing, distribution, systems, and network applications using a real world interface; and
5. Brings functionally robust management tools to client/server systems.

The need for a system to accomplish these objectives was the result of certain historical developments that resulted in many users having widely diverse computer systems. In the early years of computing, mainframe computers were widely used. The advent of client/server systems brought a new dimension to systems management. Multiple computers, from a simple one client/one server environment, to a complex array of different computers from different manufacturers supporting large and complex client/server applications using a wide variety of software systems must be administered as if they were one interoperable system.

In large networks, with hundreds, or even thousands, of workstations and dozens of servers, administration and management of the individual workstations is a very substantial task. The administration can include workstation configuration control, system security, workstation fault correction, application monitoring for software license compliance, software application distribution, software version control, and customization of user environment. In such large networks, administration became time-consuming and tedious because the system administration was in the same physical location as the workstation. Since these workstations are typically spread over a large areas such as a large, multi-story building, multiple cities, and even multiple countries, a significant amount of time and effort was spent in traveling between workstations to perform management tasks.

In the prior art, the focus of system management was on network equipment and systems. See, Stafford, "Application Management—Client-Server's Missing Link," *Bar Business*, Feb. 1, 1996, Volume. 12, No. 2, p. 133. The prior art had developed infrastructure that support the users' key assets: enterprise client-server applications and the data within them. However, client-server application management was non-existent. Client-server users could only inefficiently, if at all, account for the assets within the system, determine what applications were on their networks, assess how those applications were performing, identify failures occurring in hardware or software assets, and then diagnose and correct faults. In part, because of these difficulties, planning for network growth also was a task that was difficult at best. Prior to the invention described herein, there was no built-in way, efficiently, to get this information in a distributed application environment.

Unsuccessful attempts have been made to develop an end-to-end solution to provide real time information about application health, administration, service level and performance. Application health typically encompassed queues, process states, interrupts and network traffic. Two dimensional lists of assets, presented on a monitor, were utilized. Using these lists, systems administrators dealt with application control issues, such as start/stop, user authentication and load balancing. Service level and performance includes response time, trend analysis, threshold alert and predictive analysis. Failures were hard to trace when the application management was not part of a system/network management scheme. Typically, businesses reported that a significant percentage of client-server trouble reports were attributed to application software.

Mainframe systems had embedded, centralized application monitoring facilities. However, in distributed environments, following the data flow is a complex task, since application and data go through many steps. Therefore, there has been a long felt need for a system which could capture and act upon information about the behavior of all the applications running on a networked system that included client-server systems.

Developers have attempted to create a system to monitor a client-server network in its entirety. Conventional network management solutions stabilized the infrastructure that support the user's key assets, enterprise client-server applications and the data within them. Then a second generation of development products were developed which attempted to monitor a client-server network in its entirety, across heterogeneous platforms, from a single console. These systems monitor certain functions such as CPU time, input/output and disk space and also perform and monitors security for the enterprise. They provided such functions as sending alert-or-perform-the-task signals to enforce enterprise-wide policies for such things as network performance and security access.

However, as systems became larger, more widespread, and more heterogeneous, prior to the present invention, there has been no acceptable method for a manager fully to comprehend either the network system or the assets relevant to a particular malfunctioning subsystem. Conventional human interfaces, such as "trees" which displayed the structure of the network in text form, or simple icons, which represented parts of the system in two-dimensional form, were inadequate to provide a real-time system overview, or subsystem overview to allow the administrator to envision a system, its malfunction, and the corrective action needed.

Thus, prior to the present invention, there has been no application management system and process, which would provide an understandable, yet comprehensive, system-wide overview of the network, or of a subpart of the network. The present invention relates to a method and apparatus of providing a three dimensional, animated overview and system to monitor and troubleshoot even the most complex client-server system. Also, prior to the present inventions, there has been no client-server administration system which not only can monitor an individual resource or specific platform, but also can provide an effective connection between specific business operations and enterprise information technology management.

The present invention achieves a broad reach of hardware platform integration across heterogeneous networks and applications. This allows the present invention to manage business processes and production activities such as by detecting a potential inventory shortage and sending out a rush order to the appropriate supplier.

In many applications, including network management, modeling, web site design and project management, user interfaces can be based on graph diagrams. These diagrams show icons or shapes interconnected with lines. To convey more information about the objects and connections, both may be annotated with text and numbers, or drawn with different shapes, icons, colors or animated effects.

It is also common that the objects in such diagrams, and sometimes the connections as well, may contain further structures. The contents of an element in the diagram may be represented as another diagram of the same type, or in some other form, including other types of diagrams, property sheets or text. The most common type of navigation in user interfaces based on this concept is opening the component to see its contents. For example, by double-clicking with the mouse, selecting a menu item or other similar action, the user replaces the current view with another one. The new diagram may replace the current one in the program's window, or may open another window.

However, this common user interface approach has several disadvantages. The sudden transition from one diagram to another has the effect of losing the context for the user: the elements in the contained diagram have no visible relationship to the elements of the containing structure. It is also psychologically jarring, and interrupts the work flow. Further, it enforces a hierarchical structure among the graphs that is not always significant.

Other user interfaces have used the concept of continuous zooming to reflect such containment structures. Icons are displayed on a virtual desktop, and the user can seamlessly zoom and pan on this desktop. As the user zooms in and the icons become larger in the user interface, their internal structure appears, in the form of other icons, text or other information. The user interface permit indefinite zooming, as long as there is more information contained in a visible element.

While such systems have several usability advantages, they have not been able to represent the more complex structures that require graph diagrams, with interconnected nodes.

In the field of network management, the common techniques for visualizing the structure of the network are nested 2-D diagrams, 3-D visualization, tree controls and the new continuously zooming infinite graph diagram. Each of these techniques has advantages, but none is good at handling one particular problem: following a trail of relationships in a very large and bushy graph. The problem is common, and is characterized by a rapid fan-out of links. These links may represent physical network links, logical network links at various levels of a network stack, or the logical dependency relationships that drive Quality of Service analysis, impact analysis and root cause analysis.

If all of these links are displayed in a conventional static diagram, the diagram is rapidly overwhelmed by the number of links. Various prior-art visualization techniques attempt to deal with the problem through nesting, filtering or scrolling, but none is very successful.

The hyperbolic tree is a well-known technique for visualizing directed graphs. It renders the diagram as a straightforward expanding tree, and solves the bushiness problem by rendering the graph on a hyperbolic surface. The diagram appears to the user as if it is drawn on the surface of a sphere: as nodes get further away from the center, they get smaller and eventually disappear over the horizon.

SUMMARY OF INVENTION

A. Real World Interface.

The present invention is a system and apparatus for visualizing the components of a computer network system as a realistic three-dimensional environment for the purposes of systems and network management. The three-dimensional rendering called the "Real World Interface," by using "Virtual Reality" technology, shows computer systems, printers, network routers and other devices with their network interconnections, in a realistic or stylized environment symbolizing a geographic region like a country, region or city, together with buildings. The user of the system can travel in the environment, using various interaction devices, and directly select devices for manipulation. The useful, practical application of the present invention is to allow the administration of systems comprising 10,000 units or more efficiently, by displaying in virtual reality on a computer monitor the relevant portions of a computer network, thus allowing the use to be intuitive as if physically present at numerous remote locations.

Further, the present invention allows the user to visualize all the information known to a distributed, multifaceted database, and to provide an overview of all the data, by use of comprehensive, manageable, intuitive views that relate to practical business issues. The present invention also includes a real world interface which uses automatic piloting or alternatively, manual piloting for traversing the networked topography. Fast pathing and color coded alerts allow the user to determine precisely which resource is experiencing a problem. Users can then drill down to any node and access management functions to resolve the problem or administer the system. The present invention exceeds the design goals of prior art systems and interfaces. However, the present invention offers a choice of user interfaces including tree views and two dimensional map views. All of these user interfaces offer a high degree of user defined customization and filtering capabilities including the ability to create business process views.

Such views and visual aids allow a systems administrator to maximize use of his or her intuitive, communicative, and diagnostic skills in applying such diagnostic and corrective systems to address a malfunction in hardware, firmware, or software. Business interest views filter the views to isolate specific business interests, such as management inventory or payroll, and then to present virtual reality views, allowing an administrator of a networked computer system to review and manage the specific assets that relate to that business interest.

B. Comprehensive End-to-End Management of all Resources.

The real world interface of the present invention provides a real-time 3-D view of all the assets in a networked computer system, from the global network, to the computers in each area, to their processors and drives, down to abstract objects such as databases, applications and running processes. The present invention provides a system that allows the systems administrator to identify, and in realistic views, to see relevant parts of the network, and to see its status and configuration. This facilitates diagnosis and correction of any problem effectively identified by use of the navigation tools and by directly activating manipulation and control software to correct the problem or to adjust the operation of the object.

It is another object of the present invention to achieve administration systems which have other valuable features: an integrated operability that enables each function to work seamlessly with the others; a common model for administering all aspects of systems management with the same look-and-feel for all functions; an open and interoperable solution that works across platforms, complements network managers, and easily connects to other solutions; a robust, proven set of systems management functions that meet all the basic needs for managing client/server systems; and a customizable interface that can be tailored to meet the present and future unique needs of different users within a company or organization.

A further objective of the present invention is to broaden the scope of the systems under management, providing a comprehensive and business-oriented view of a full enterprise network. The invention describes in virtual reality terms the hierarchical structure of a network. The present invention includes a hierarchical organization of the various worldwide computer system components, including continents, wide area networks, cities, buildings, subnetworks, segments, computers and peripherals, and their internal hardware, firmware, and software resources. However, another objective of the present invention is to provide a system that does not impose on the user any particular hierarchical model. The present invention allows the use of configuration tools enabling the user to set up any logical structure.

C. Business Process Views.

Business process views filter the realistic perspectives necessary to reflect on a specific business interest, allowing a manager to review and manage a world that contains only computer-related assets relevant to that interest (payroll, inventory, cost accounting, etc.). Close integration with the monitoring and administration facilities give immediate access to servers and workstations, reflecting their current status and providing fine-grained remote control.

In the present invention, Business Process Views allow users to customize the inventive system to dynamically construct filters to view resources as they pertain to unique business roles or functions, business applications, locations or geographies, or any traditional resource view. This concept inverts the traditional resource-centric view of enterprise management into a logical view, mapping managed resources needed to a specific business perspective. For example, views include but are not limited to, one or more of the following: geography or location such as Northeast U.S. applications; a functional role such as that of an administrator or security manager; any business application such as an inventory or payroll; any community of interest, such as all users interested in a specific set of resources; and resource views such as a database, network, or a server, or any combination of the above.

This allows the user to identify the parts of the network that relate to a specific business interest such as inventory control or payroll, and to display those parts in 3-D virtual reality enabling the user quickly and intuitively to identify and solve a problem with a payroll server.

D. General Applicability.

The present invention can be applied to the management of any system consisting of devices capable of some form of industry standard network communication, including dial-up networking. Such devices include but are not limited to: manufacturing, refining, and chemical processing equipment; air conditioning/heating systems; automated prison door and other security systems; electrical lighting systems; forklift systems; travel systems; and elevator systems.

The present invention will become more fully disclosed and understood from the detailed description given herein, and from the accompanying figures. That description and those figures are provided by way of illustration only. Changes, modifications, implementations, and embodiments obvious to one skilled in the art given the within disclosures, are within the scope and spirit of the present invention.

DETAILED DESCRIPTION OF THE PREFERRED EMBODIMENT

A. Constructing the Inventive System

The invention is accomplished by use of the 3-D graphical user interface, network discovery and monitoring software engines that interact with and enable the interface and a central repository, and a central repository comprising a comprehensive database describing every computer-related asset on a network.

In the preferred embodiment all of the objectives of the present invention are accomplished.

Architecture

Figure 1:
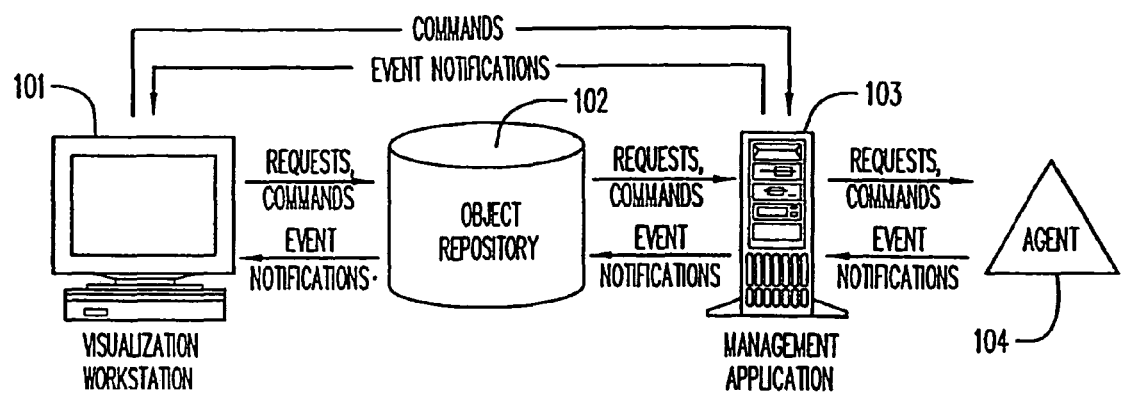
FIG. 1 is a global diagram showing the relationships between the various system components used in conjunction with the present invention.

The various components that comprise the complete network analysis system is shown in FIG. 1, and includes one or more of visualization workstation 101, an object repository 102, one or more management applications 103, and one or more agents 104 on each such management application. The visualization workstation interacts primarily with the object repository 102: it requests information from it, it sends commands to it, and it gets notifications of events such as status changes or object additions from it. The repository 102 in turn gets this information from the various management subsystems 103 which are fed by the agents 104 on the managed systems. The key architectural consideration of the present system is that in normal operation, the visualization workstation 101 interacts only with the object repository 102. This minimizes network traffic, optimizes the performance of the rendering on the workstation, and minimizes the interconnectivity between the visualization workstation 101 and the multitude of management subsystems and agents existing in practical networks.

On rare occasions, the visualization system sends commands directly to management systems and gets event notifications directly from management systems (or indeed from any other application on the network). Thus, the architecture is designed for optimal operation and minimal network load in normal operation, without imposing limitations on the forms of communication possible in special cases.

Figure 2:
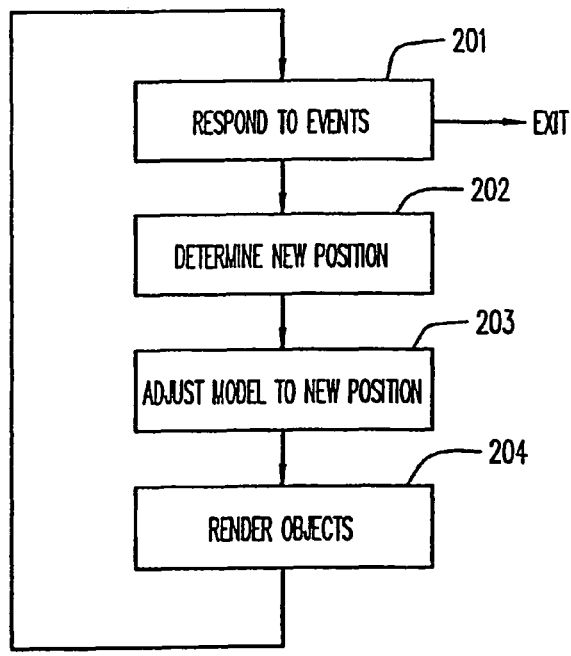
FIG. 2 is a flow diagram showing the operation of the main control loop of the virtual reality workstation software system.

The main program operation and display management process is show by FIG. 2. The program operates in a loop, repeatedly performing the same functions until the user terminates the program. The loop begins by receiving and responding to events shown in module 201. If the event received is an Exit command, the loop terminates. Otherwise, the loop continues by determining a new position of observation 202. Next, the visible models are adjusted to reflect any changes in position 203. Finally, the graphical objects are rendered 204. In order to achieve smooth animation, it is important that this main program loop executes as quickly as possible. The ideal rate of execution is 30 repetitions per second, which corresponds to a video frame rate.

Figure 3:
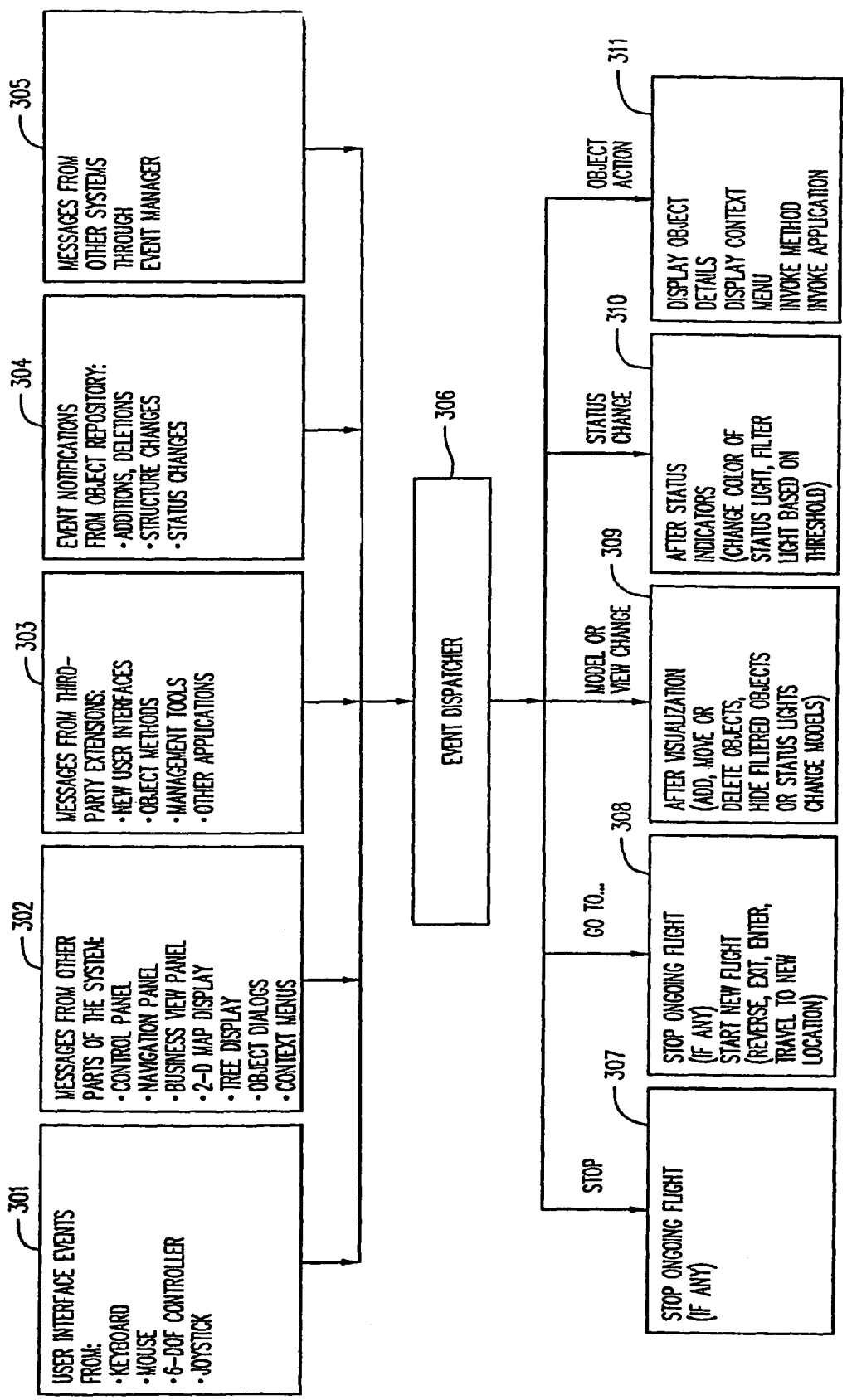
FIG. 3 is a flow diagram that describes the processing of and the responding to various events.

FIG. 3 elaborates on module 201 of FIG. 2. This module deals with the system responding to events. The five modules shown at the top of FIG. 3 represent the different types of events the system receives. These include user interface events 301, messages from other parts of the virtual reality workstation 302, messages from third party extensions installed in the virtual reality workstation 303, event notifications received from the object repository 304, and messages received from other systems 305. All of these events and messages are processed by the event dispatcher 306, which calls appropriate code modules to act upon the events and messages. These include a module to stop the current flight 307, a module to begin a new flight 308, a module to change the visualization 309, a module to handle a change of status 310, and a module to perform specific operations on objects 311.

Figure 3A:
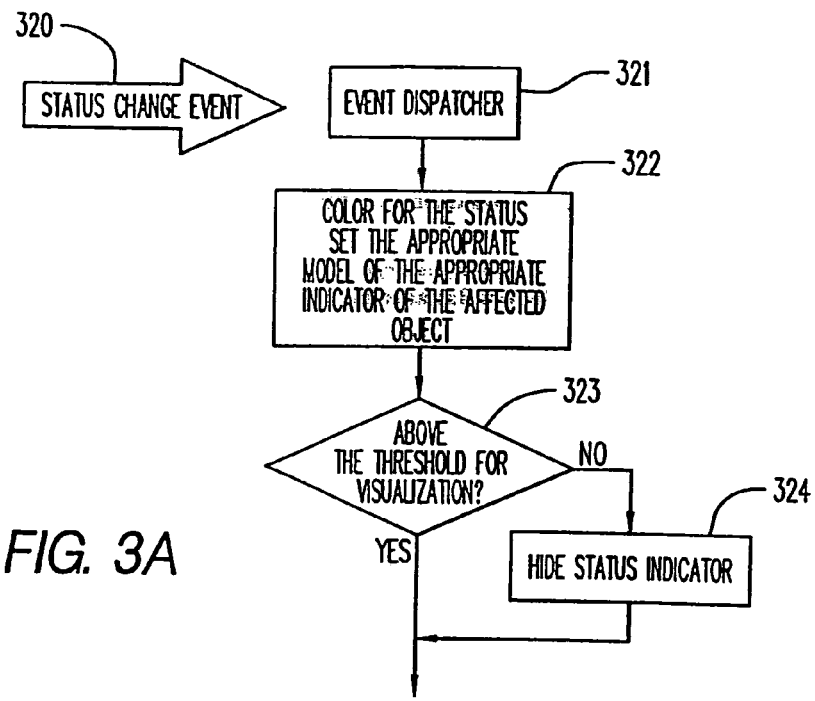
FIG. 3A is a flow diagram that describes the processing of status change event data shown in FIG. 3.
Figure 4:
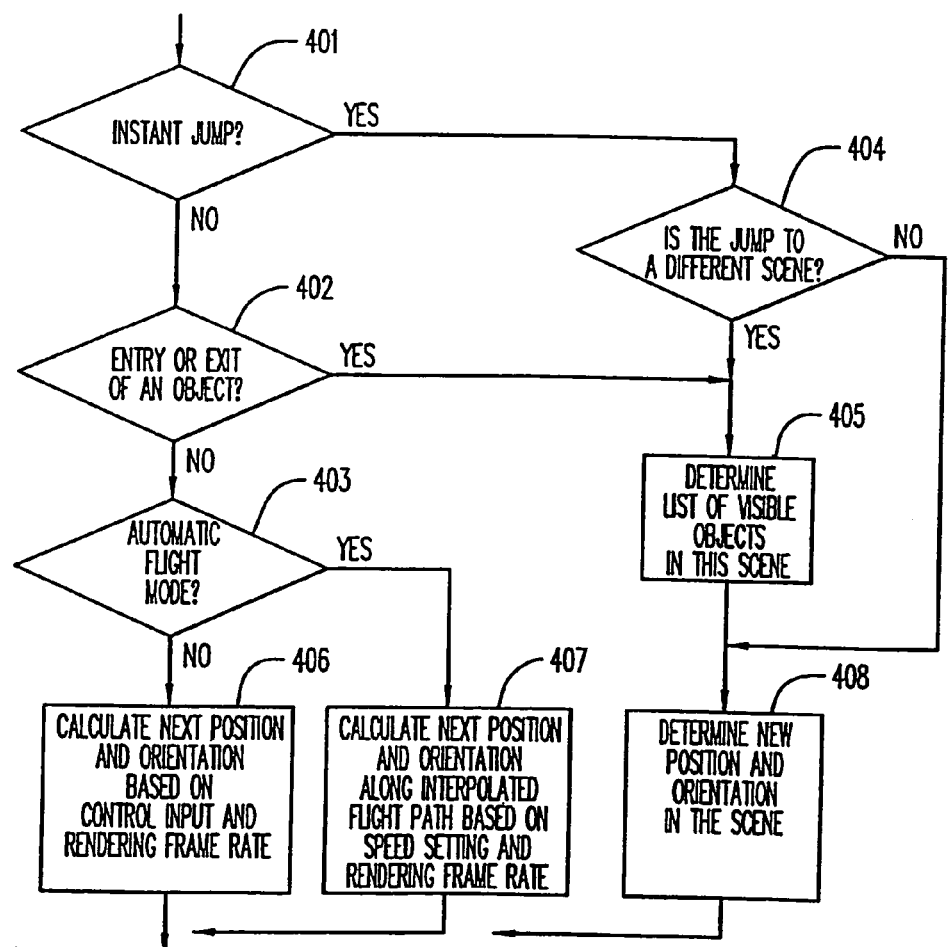
FIG. 4 is a flow diagram the presents the algorithm used to determine the next position of the virtual reality system view.

FIG. 3a elaborates on status change 310 of FIG. 3. The status change event 320 message is sent to the event dispatcher 321 which communicates with the module 322. Said module 322 sets the appropriate model of the appropriate color for the status indication of the affected object. A decision is made in module 323 as to whether a preset threshold for visualization has been exceeded with either the status indicator being hidden at module 324 or the appropriate change of status signal being sent. Figure determining if an instant jump must take place 401. If not, the system determines if the viewer should enter or exit a scene 402. If not, the system determines if automatic flight mode is active 403. If automatic flight mode is not active, the system calculates the next position and orientation based upon the input control devices and the rate of frame rendering 406. If automatic flight mode is active, the system calculates an interpolated position and orientation along a calculated flight path 407. If module 401 determines that an instant jump must take place, a determination is made if the jump is to a different scene 404. If so, or if module 402 determined that an object must enter or exit a scene, the system determines a list of visible objects in the current scene 405. Finally, the system determines a new position and orientation 408.

Figure 5:
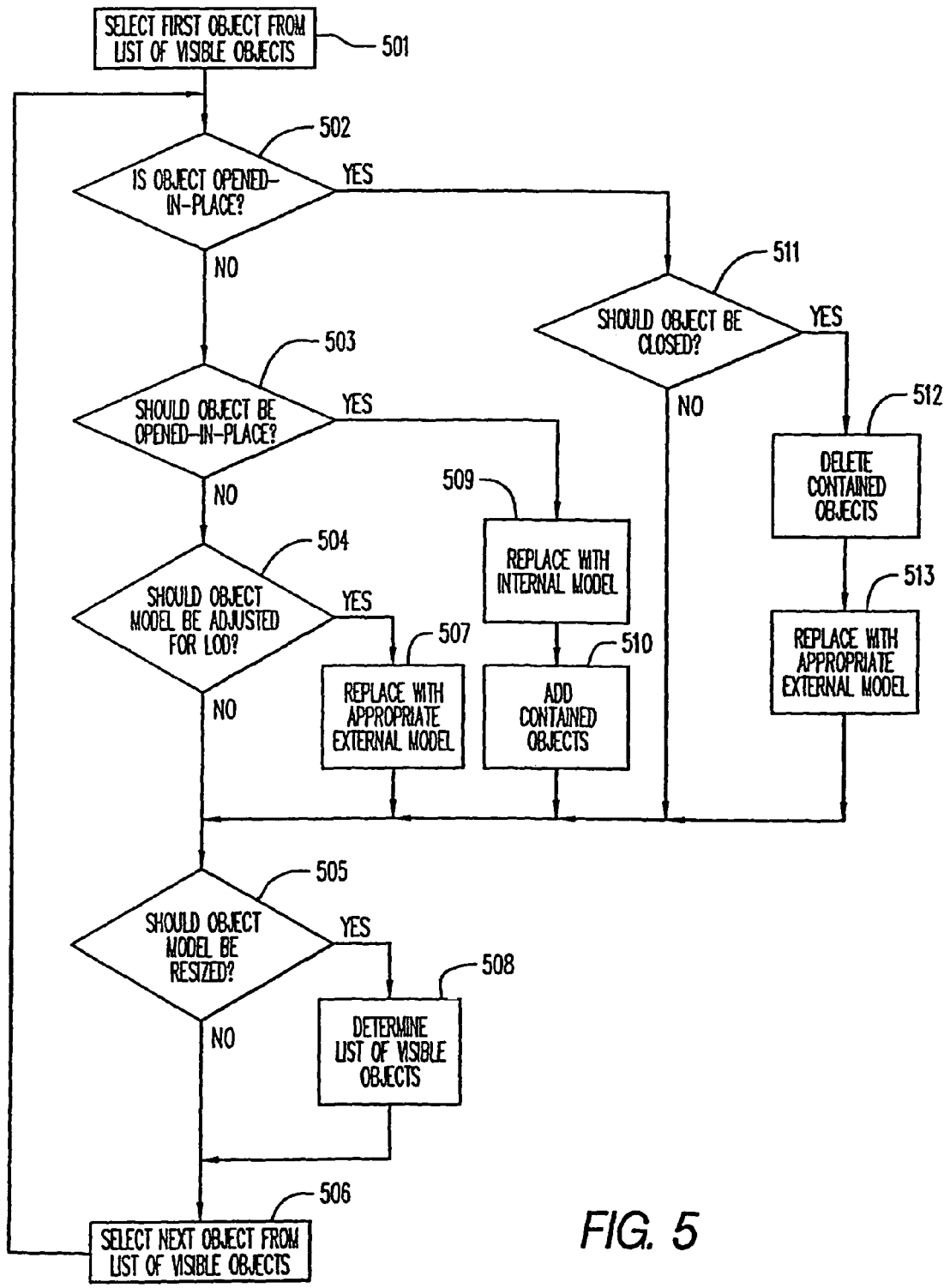
FIG. 5 is a flow diagram that describes the process used to adjust each system model according to the viewing position.

FIG. 5 elaborates on module 203 of FIG. 2. This module deals with the system adjusting models to reflect any changes in position. Modules 501 and 506 handle the iteration through the list of visible objects, selecting each object to be rendered. Module 502 determines if the object is opened in place. If it is, module 511 determines if the object should be closed and, if so, modules 512 and 513 delete any contained objects from the list of visible objects and replace the closed objects with the appropriate model. If module 502 determines that the object is not opened in place, module 503 determines if the object should be opened in place and, if so, modules 509 and 510 replace and add needed objects. If module 503 determines that the object should not be opened in place, module 504 determines if the object should be adjusted for level of display and, if so, invokes module 507 to replace the object's model. Module 505 then determines if the object should be resized and, if so, calls upon module 508 to resize the object model. Finally, module 506 retrieves the next visible object, iterating through the entire list.

Figure 6:
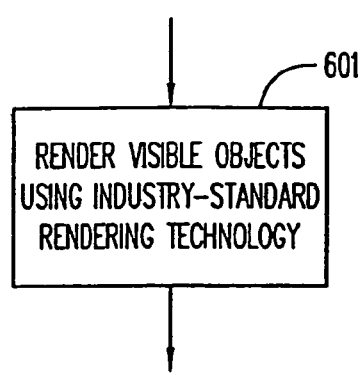
FIG. 6 is a flow diagram that describes the rendering of each visual object.

FIG. 6 elaborates on module 204 of FIG. 2. This module 601 performs the actual graphics rendering of all visible objects. Objects are rendered in the invention using a graphics accelerator. When available, and in other embodiments, however, sufficiently fast main frame system processor(s) could be used to perform the rendering. The present invention performs the rendering using the OpenGL graphical interface library. This library is structured such that the calling program need not be aware of the underlying graphical hardware. The use of a software implementation of OpenGL on current microprocessor-based systems, however, will result in a speed penalty.

The object repository 102 in FIG. 1 is notified of major changes in the system configuration or status (changes to those objects it maintains) through the standard event notification mechanism of the invention. Because only major, relatively static objects are maintained in the repository, the real world interface is kept up-to-date on important changes while network traffic is limited.

When the workstations require dynamic data, which is maintained only on the remote SMS databases and not replicated in the repository, the repository server passes their requests on to the remote systems. The workstations can access all data, whether stored locally or not. This allows the system to balance the conflicting requirements. For example, important servers may install monitoring agents to report continually the status of a database server. This information is already monitored centrally, with event notification over the network, and displaying these monitored processes centrally does not burden the network excessively. But if the user asks for visualization of all the processes running on the server, the system makes an on-line query to the machine; this query, which does burden the network, occurs only when requested.

Technical Specifications

In the standard configuration, there will be one object repository server shared by several workstations; the object repository communicates with the distributed management facilities across the heterogeneous network, and the workstations communicate only through the repository server.

VR Workstations

The operating system is Windows NT. A Unix system may be supported in other embodiments. The preferred hardware embodiment includes a personal computer utilizing not less than a Pentium 586 microprocessor by Intel. The computer should contain at least 32 Mb of Random Access Memory and a 3-D accelerated video board with OpenGL support. The preferred system should include a powerful workstation running the Windows-NT operating system. The preferred embodiment uses the standard Open GL 3-D rendering facilities provided in Windows NT; for good performance, the platform should provide hardware acceleration of OpenGL, which is provided by a number of vendors including Intergraph.

Object Repository Server

The Operating System is Windows NT. A UNIX system may be supported in other embodiments.

The hardware is an Intel-based PC. Other hardware platforms may be supported by other embodiments.

It is possible to execute both visualization and repository on the same system; in that case, a dual-processor system is preferred. One or more visualization workstations can also work with an object repository operating on a separate server machine.

Network Connection

The system supports several network connection protocols to all systems that will generate events or feed data into the repository, including TCP/IP, SNA and DECnet. The repository server uses TCP/IP to communicate with the VR workstations.

Database

The current embodiment uses Microsoft SQL Server. Other industry-standard databases may be used in other embodiments.

Systems Configuration

The standard configuration combines a single object repository server with one or several Real World Interface workstations. Removing the database processing and event handling from the 3-D simulation reduces its impact on the performance and realism of the simulation. The object repository server can operate on the same machine as other CA-Unicenter processing. A minimal configuration might combine the object repository server and a Real World Interface workstation on a single machine, at some possible impact on the performance (and hence realism) of the 3-D visualization.

The inventions described above may be varied or implemented in many ways. Variations and implementations as would be obvious to one skilled in the art are within the scope of such invention.

In other embodiments of the present invention, advanced display options are provided, including an immersive display with head-mounted displays, and a cave display with multiple large screen displays encompassing the user.

B. Elements and Features

Real World Interface

The system and apparatus of the present invention displays an entire network of computers, peripheral equipment, operating systems and application programs in an environment that represents physical reality: the geographical space in which the network exists, which might span several continents and countries and might contain various regions and cities and groupings of buildings (often called "campuses"), a particular building, a particular floor of a building, and a particular room and the computer related units in the room. In order to achieve the appearances that are important features of the present invention, in addition to the exterior of the computer, the inside of the computer with internal components such as the processor, the disk storage, network card, tape storage, etc., are displayed in virtual reality. In addition to the computer devices the networks in the present invention processes, databases and other abstract objects are rendered on the display as real things.

The realism of the inventive system is expanded by the use of photo-realistic buildings with management tools so that the user may be able to feed photographs of the user's buildings or floor layouts and equipment into his system. The inventive system includes support for three dimensional models produced by industry standard three dimensional modeling tools. The inventive system also provides simple modeling tools to create new simple models. Management tools to identify computer-related units by class or category, such as a Hewlett Packard printer or an IBM server, are provided.

Figure 7:
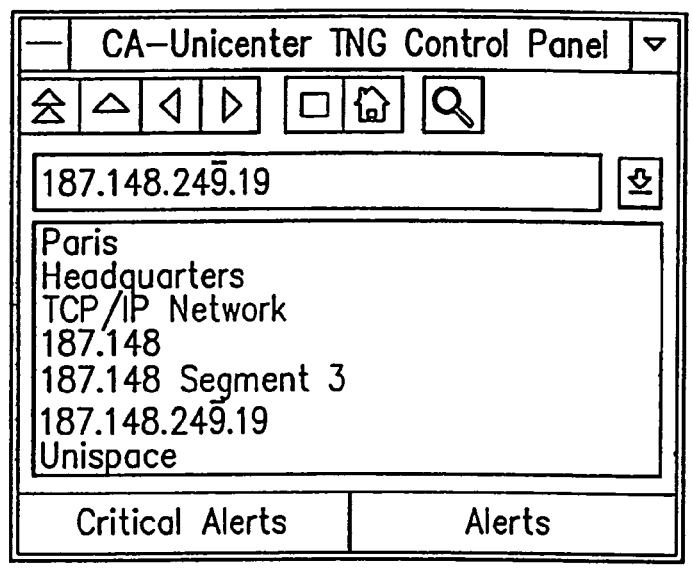
FIG. 7 illustrates the visualization workstation Control Panel.

The present invention provides to the user a control panel as illustrated in FIG. 7.

Targeting Reticule

Figure 12:
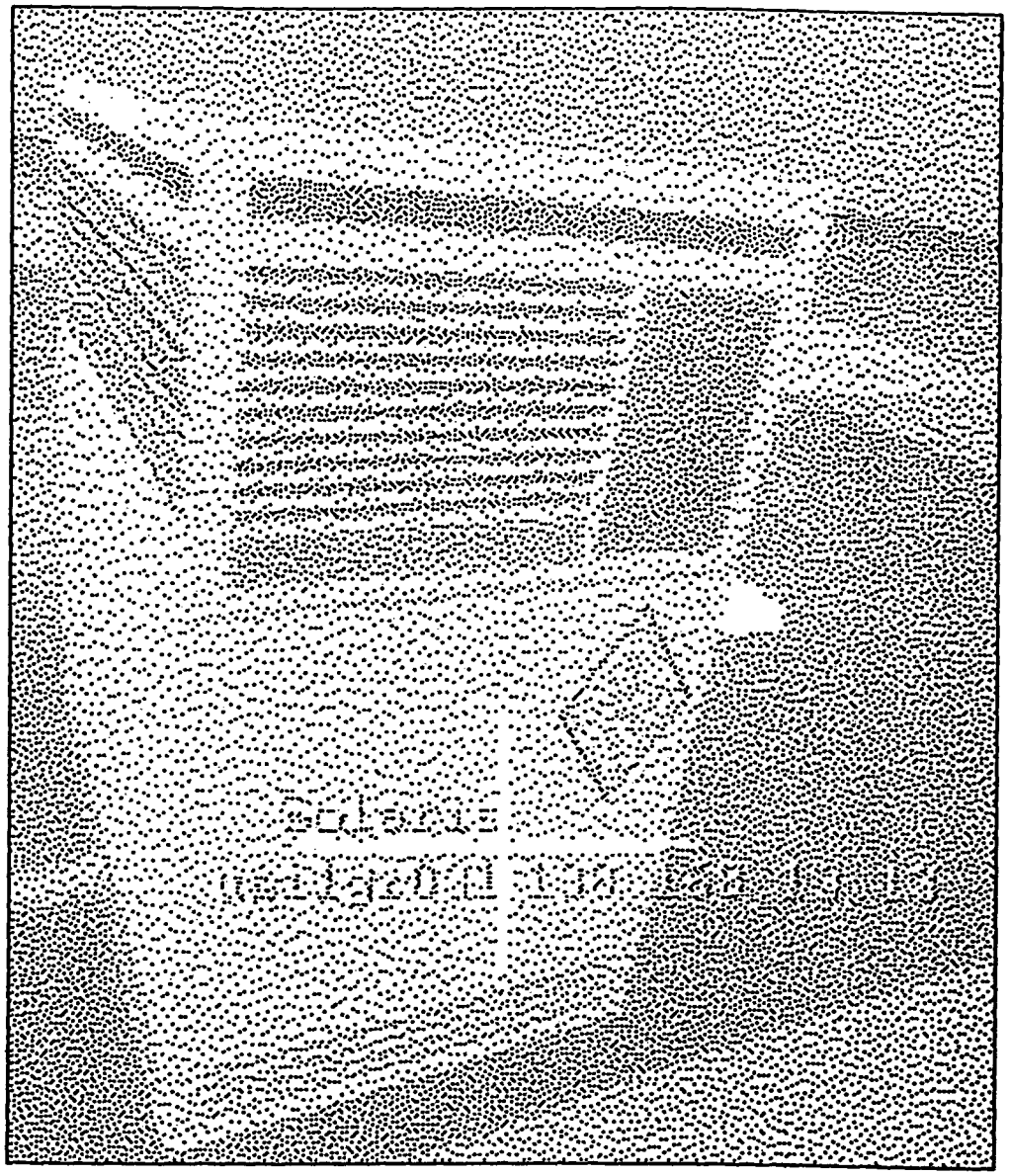
FIG. 12 illustrates the Targeting Reticule.

To identify individual objects, the Real World Interface uses the idea of an intelligent cursor or "targeting reticule" that displays information about the indicated object, as shown in FIG. 12. Illustrative information includes the network address and the name of the system. Cities, buildings, sub-networks and computers are not labeled in the 3-D view, because 3-D text is hard to read. Instead, the mouse cursor becomes a "targeting reticule" which displays information about the object the user points to. It displays the information "Hudded" (a new verb, coined from "Heads-Up Display") onto the "cockpit window" or crosshairs/quadrant display.

By simply pointing to an object with the pointing device (such as a mouse), the user can bring up a reticule that gives the formal and informal name for the object and a brief summary of its status. This technique works for all objects, from cities and buildings, to networks and computers, to disk drives and processes.

Realism Enhancers

The inventive system uses other features to enhance the illusion of reality, including the provision of geographic maps to provide backgrounds, such as realistic 3-dimensional topographical surfaces, which, through texture rendering, creates more useful views and user-specifiable maps or textures for arbitrary geographic regions that allows a customer to define a geographic area of interest.

Automatic Detection of Topology and Components

The configuration of the current invention requires the automatic detection of network topology and devices, and utilizes the automatic detection of internal computer components and of software processes. Further, the current invention includes interactive management tools for configuration of geographic relationships, buildings and network relationships. The present invention allows the override or the custom tailoring of the computer system and the network topology when automatic discovery fails, or produces unsatisfactory or incomplete results. The current invention also includes an automatic layout of logical networks and 3-dimensional space and an interactive layout of network and devices over floor plans or other diagrams.

Common Internal Structure

In the preferred embodiment of the present invention, a common internal structure is provided to allow both 3-dimensional environmental, 2-dimensional and standard user interface displays like tree diagrams, icons and folders. This is critical to allow a user to operate the system even when sufficient computer power is not available for a 3-dimensional display, or when other reasons dictate the use of other interfaces.

Customizability

Figure 10:
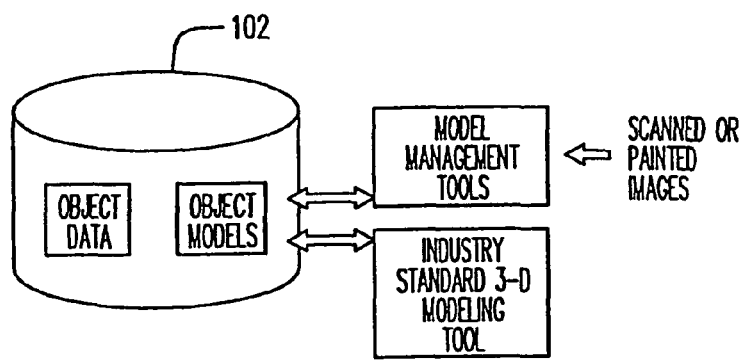
FIG. 10 presents an overview of the operation of model management tools used to configure the visual appearance of various system components displayed in the virtual reality system.

An automatic layout and 3-dimensional realism is provided to lay out logical networks, in 3-dimensional without crisscross lines. Manual configuration capability is also provided. FIG. 10 presents an overview of the configuration process. The present invention provides to the user a series of panels to achieve customization.

Figure 10A:
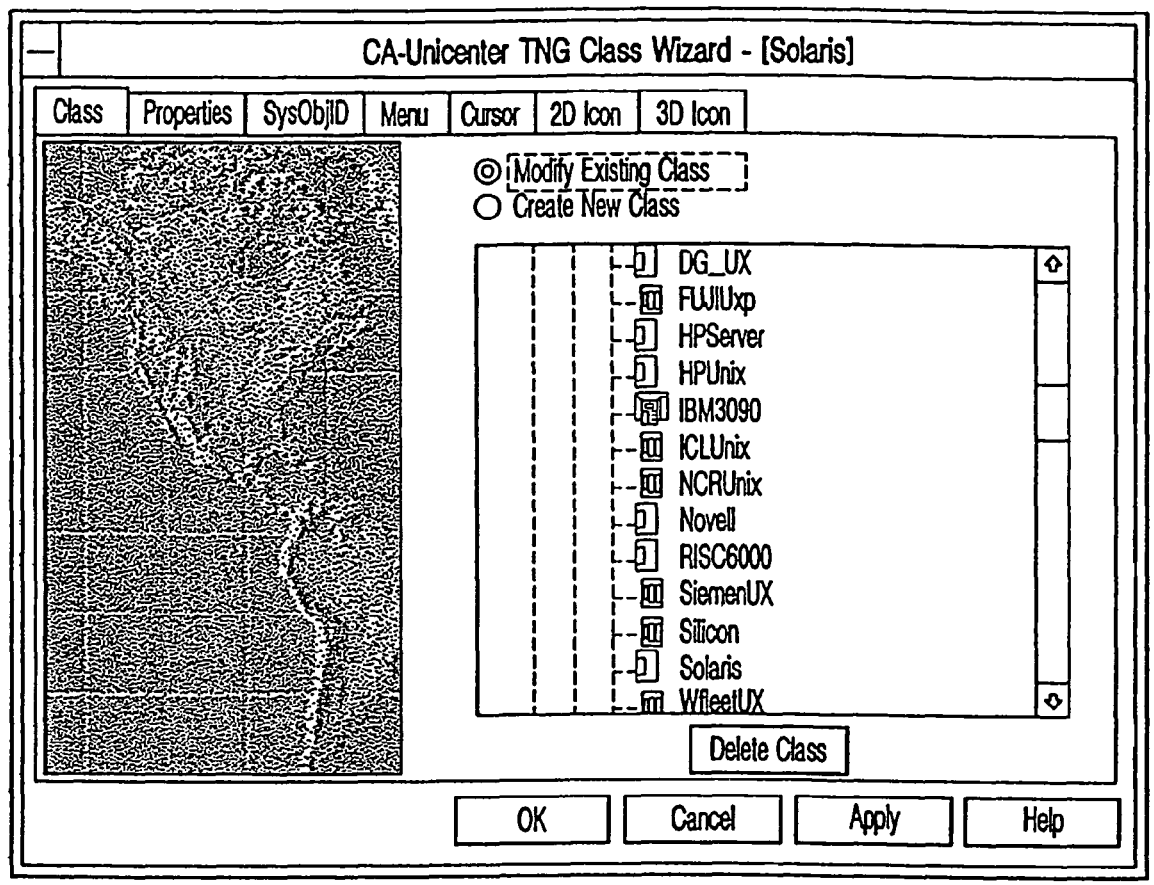
FIG. 10A illustrates the Class Editing and Definition panel of the system presented in FIG. 10.

The Class Editing and Definition user interface illustrated in FIG. 10A allows the user to select a class to work with, or to create a new class of object to be used in the system.

Figure 10B:
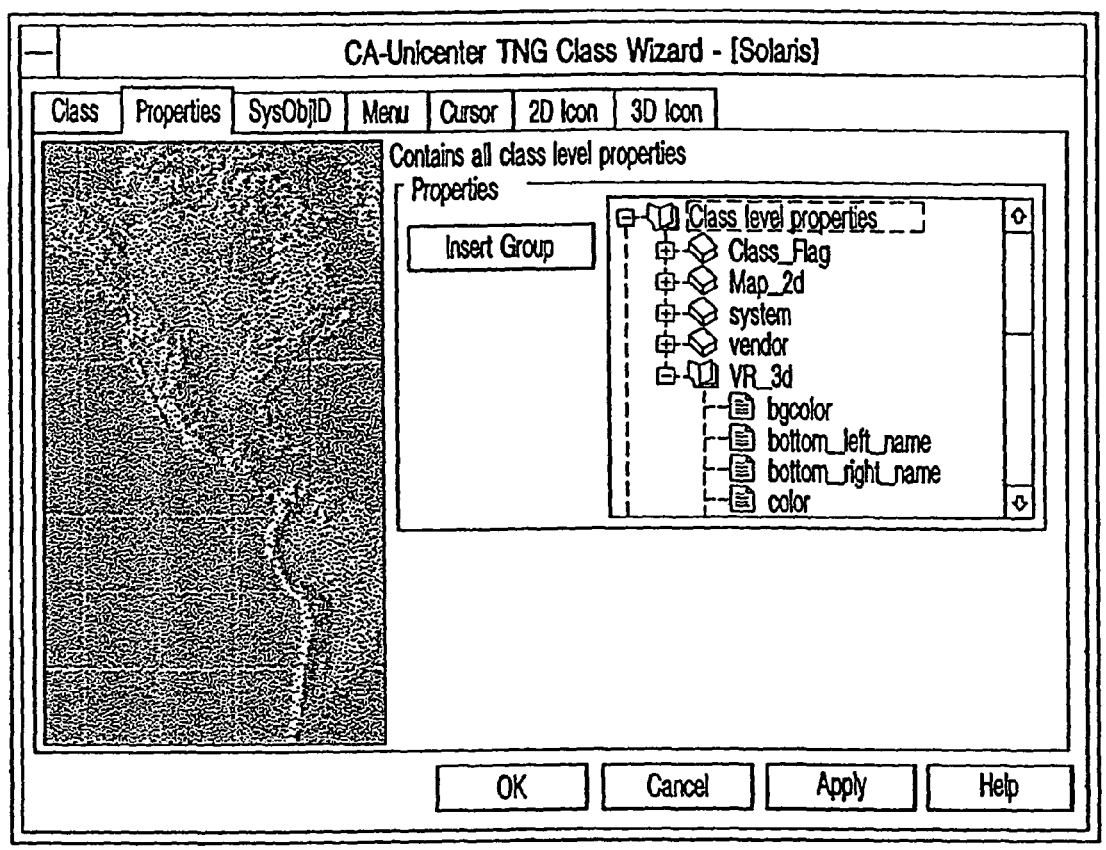
FIG. 10B illustrates the Properties Panel of the system presented in FIG. 10.

The Properties tab in the user interface illustrated in FIG. 10B allows the definition or modification of properties of the class, and assignment of values to those properties.

Figure 10C:
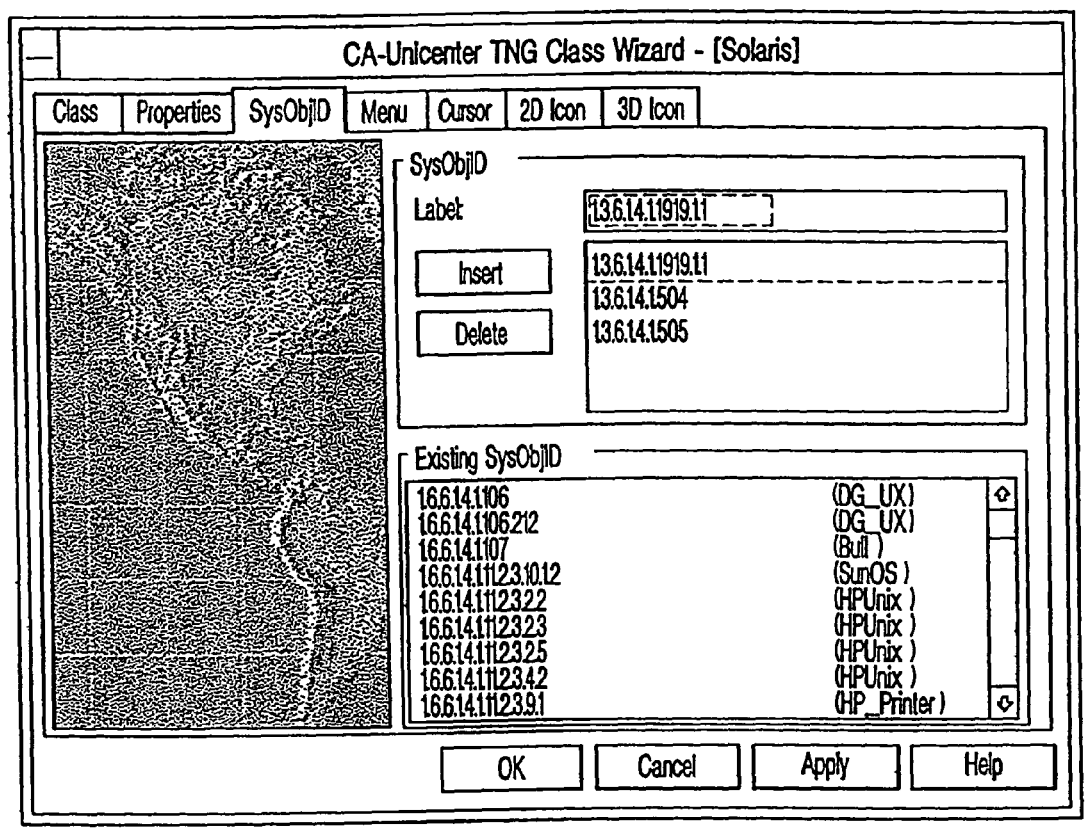
FIG. 10C illustrates the SysObjID Panel of the system presented in FIG. 10.

The SysObjID tab illustrated in FIG. 10C provides for specification of ID numbers to be used in communication with the system's own programs and with program extensions built by third parties.

Figure 10D:
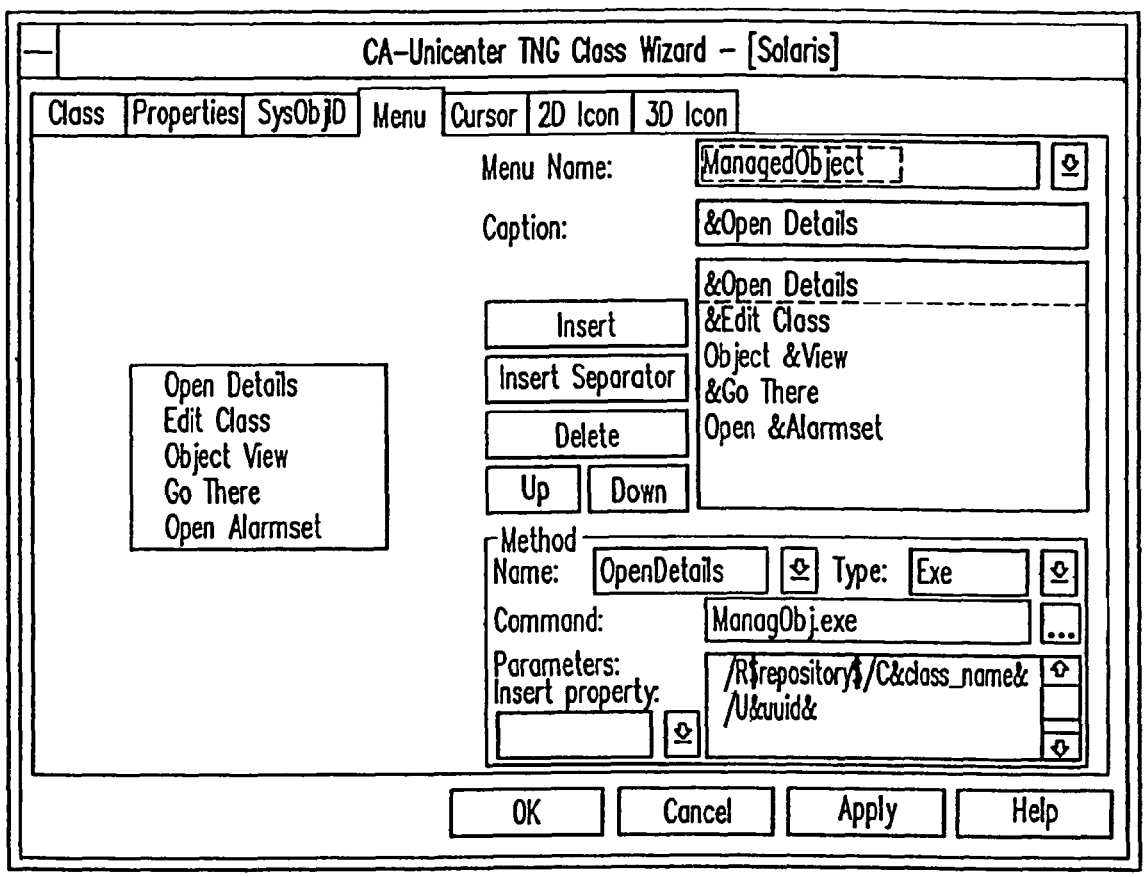
FIG. 10D illustrates the Menu Panel of the system presented in FIG. 10.

The Menu tab illustrated in FIG. 10D provides for defining the menu that is displayed when activating an object of this class, and the actions to be taken for those menu items. The actions can include communicating with built-in facilities of the system, and executing other programs.

Figure 10E:
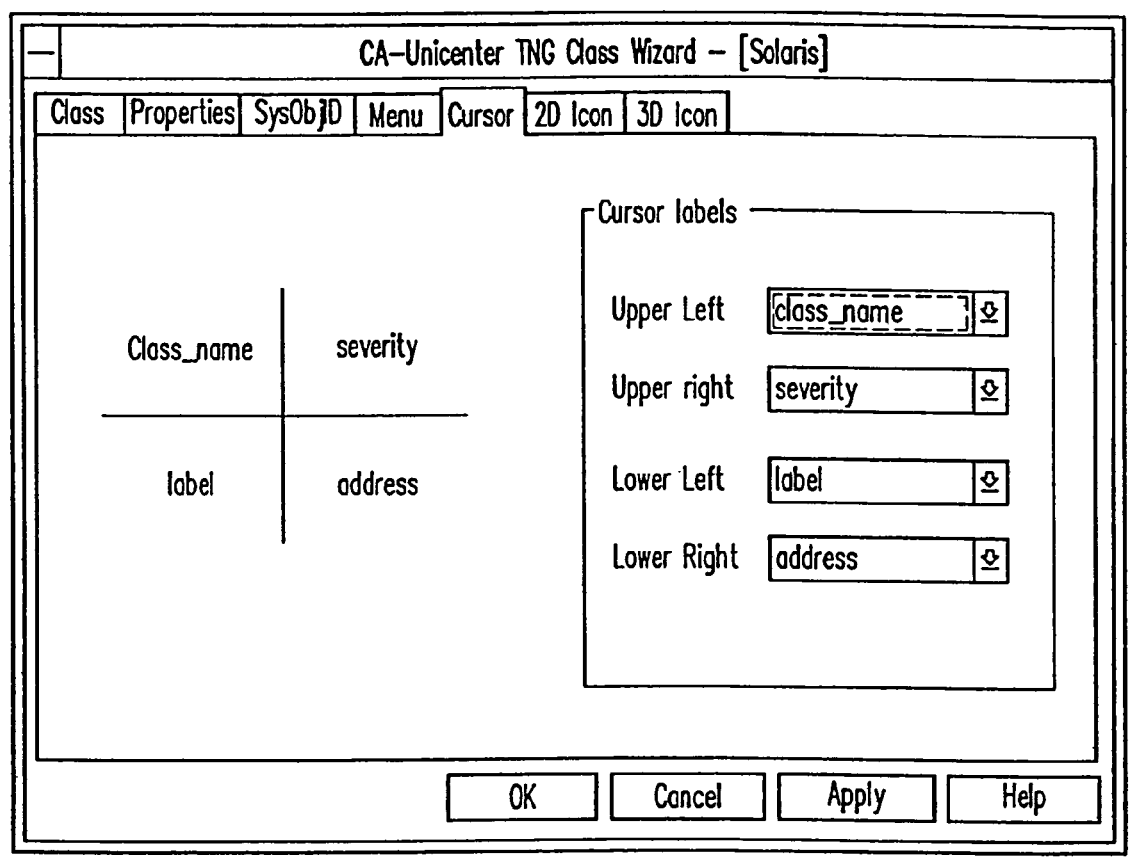
FIG. 10E illustrates the Cursor Panel of the system presented in FIG. 10.

The Cursor tab illustrated in FIG. 10E provides for specifying what data should be displayed in the four quadrants of the cursor, the targeting "reticule."

Figure 10F:
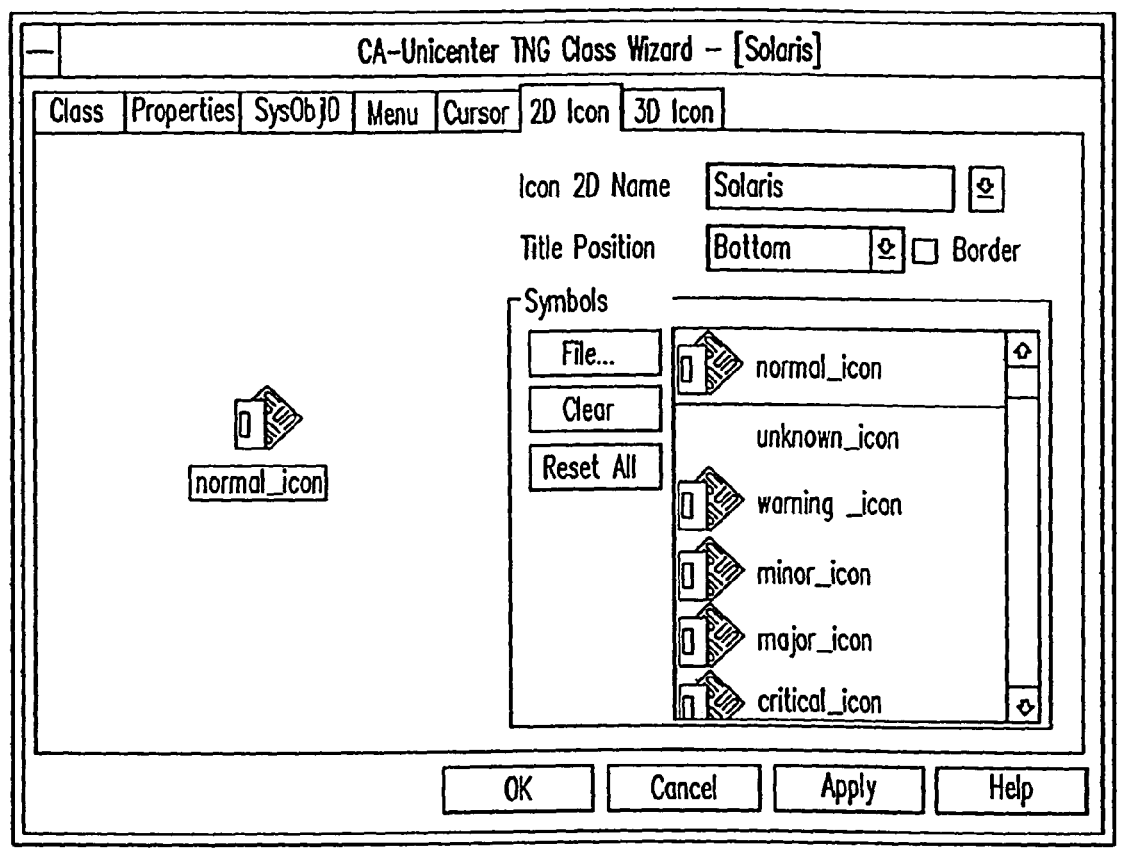
FIG. 10F illustrates the 2D Icon Panel of the system presented in FIG. 10.

The 2D Icon tab illustrated in FIG. 10F provides for specifying the icon to be displayed in the 2-D interfaces of the system, for different status values of the object.

Figure 10G:
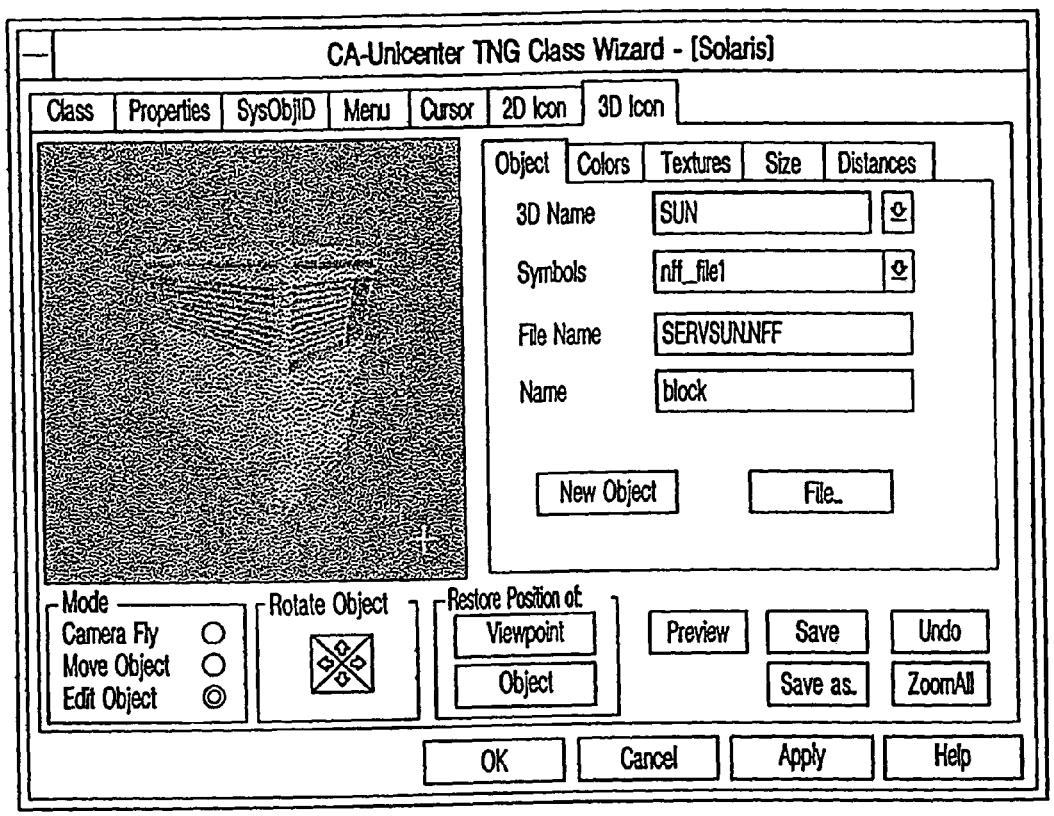
FIG. 10G illustrates the 3D Icon Panel of the system presented in FIG. 10.

The 3D Icon tab illustrated in FIG. 10G provides for specifying the 3-D model for the object, to be used in the 3-D visualization system. The model currently selected may be previewed in the window on the left at FIG. 10G. The control panel on the bottom of FIG. 10G allows for adjusting the view or the orientation of the object. The system also allows the user to select each of the various models used in the adaptive display ("level-Of-Detail" and "Open-in-place").

Figure 10H:
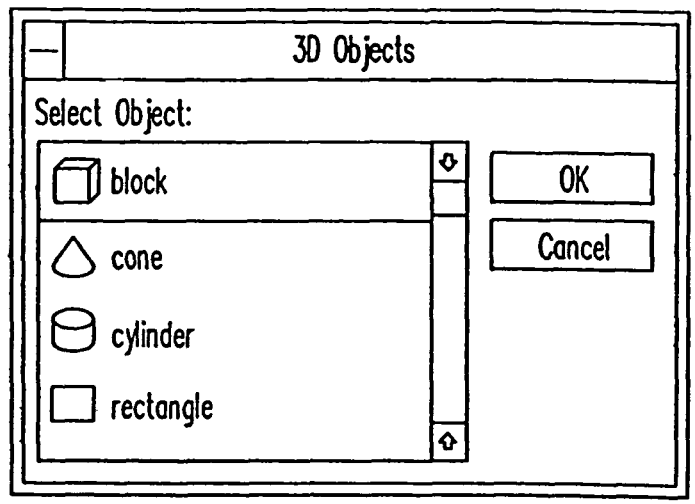
FIG. 10H illustrates the Selecting New Object Panel of the system presented in FIG. 10.

The Selecting New Object view illustrated in FIG. 10H allows the user to create a new object from simple geometric shapes. This model may then be adjusted in size, shape and orientation, and decorated with colors and texture coverings.

Figure 10I:
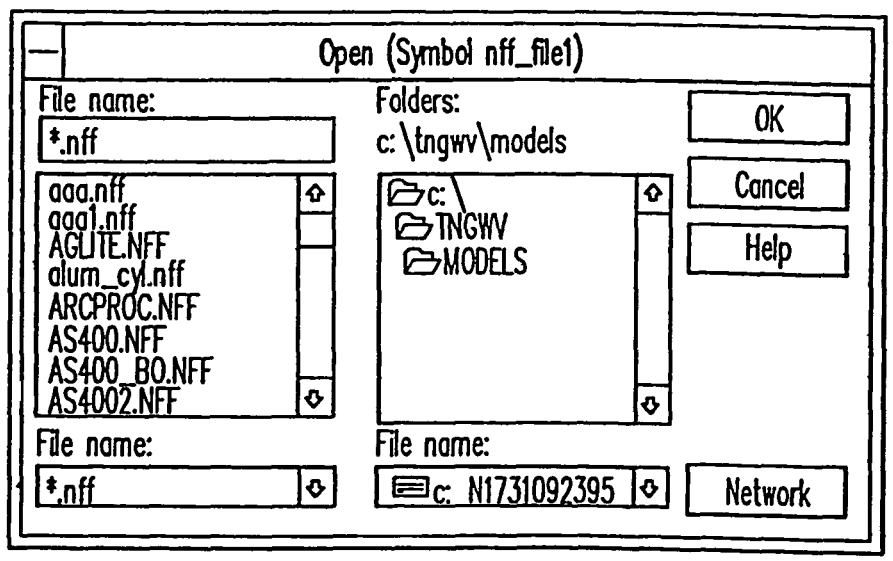
FIG. 10I illustrates the Selecting File Panel of the system presented in FIG. 10.

The Selecting File view illustrated in FIG. 10I allows the user to select an existing model generated with an industry-standard modeling tool.

Figure 10J:
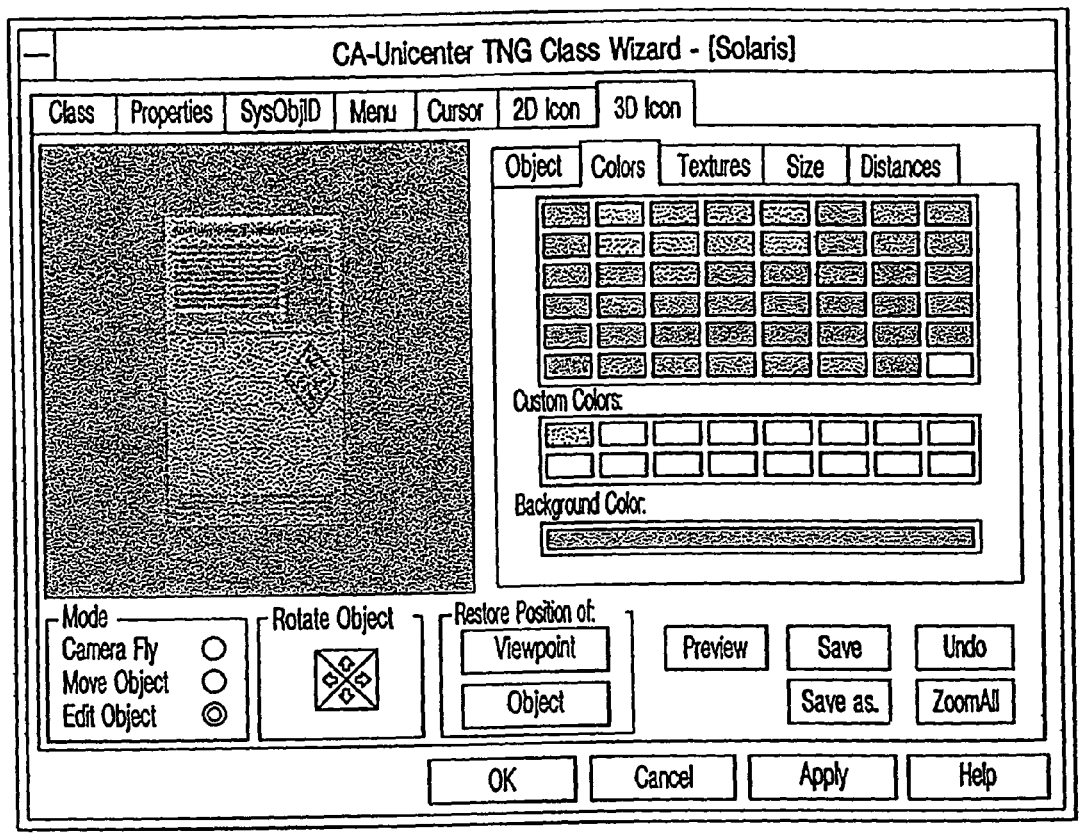
FIG. 10J illustrates the Colors Panel of the system presented in FIG. 10.
Figure 10K:
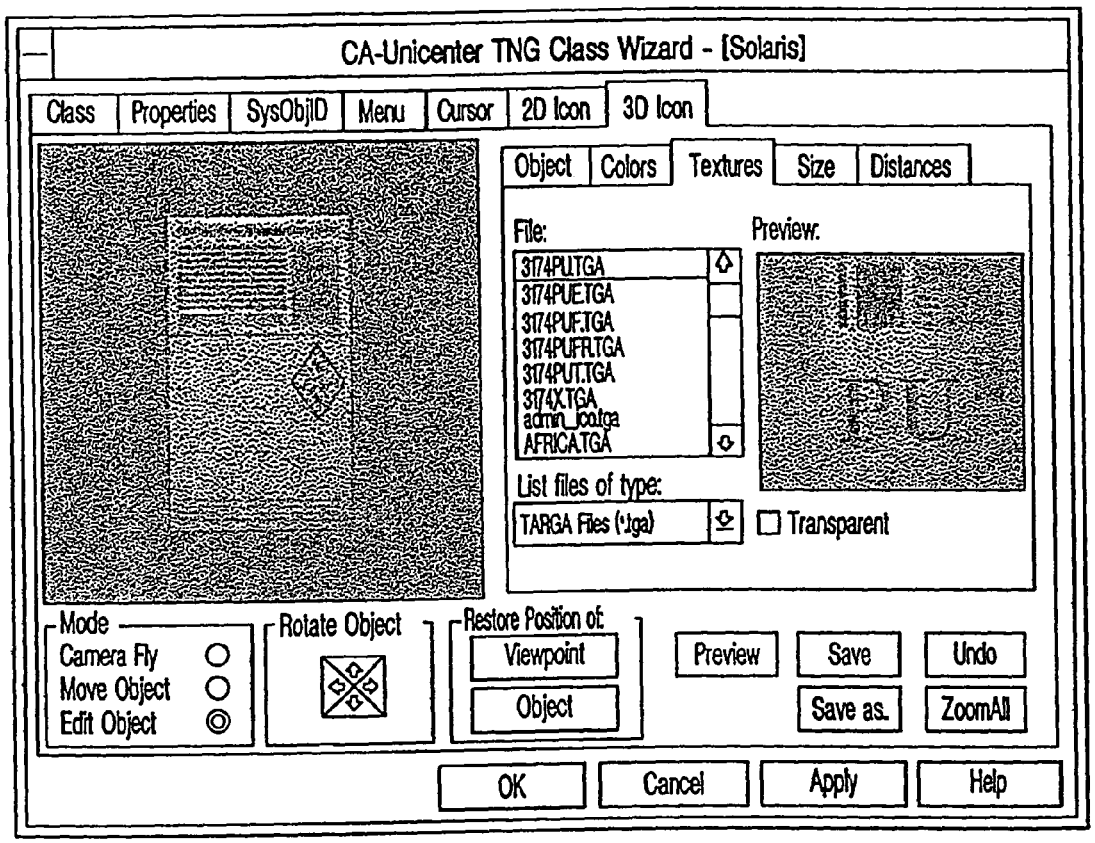
FIG. 10K illustrates the Textures Panel of the system presented in FIG. 10.

The Colors view illustrated in FIG. 10J allows the specification of the color of the entire object. The Textures view illustrated in FIG. 10K allows the user to specify the texture map (bitmap) to be pasted onto the object to give it a photo-realistic appearance. The textures are bitmaps in industry-standard formats, and are often scanned photographs (although drawn or painted images may also be used).

Figure 10L:
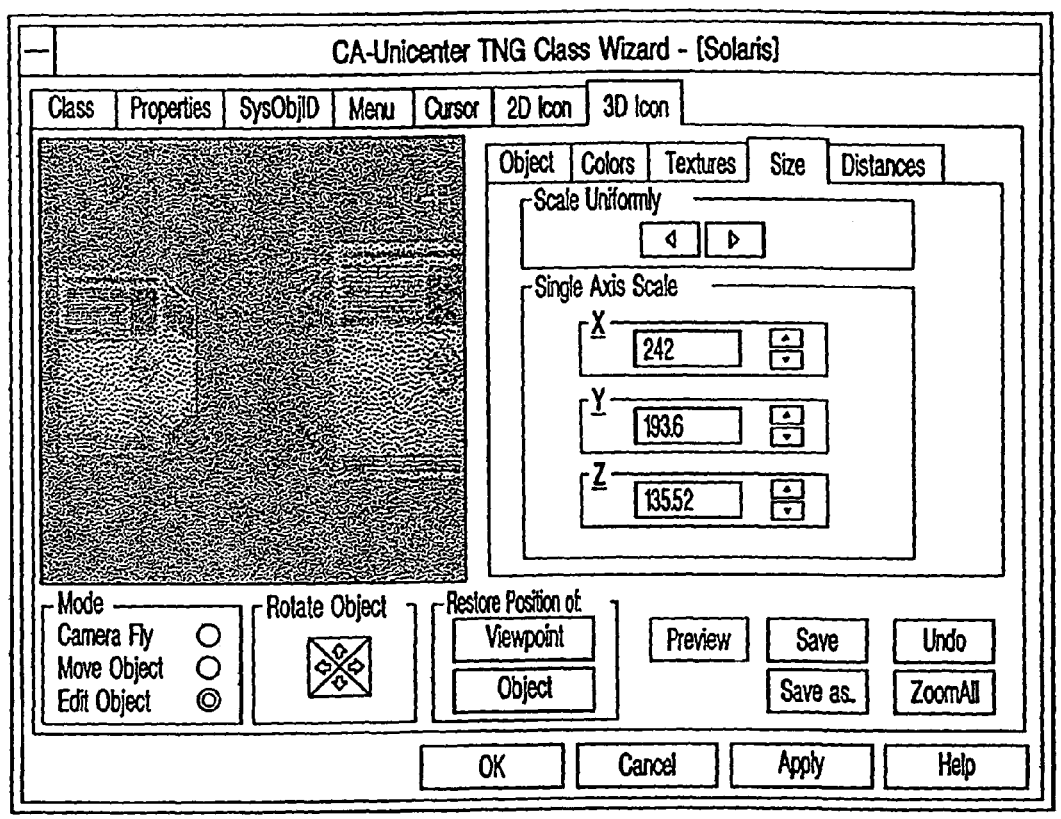
FIG. 10L illustrates the Size Panel of the system presented in FIG. 10.

The Size view illustrated in FIG. 10L allows the user to adjust the size and shape of the object.

Figure 10M:
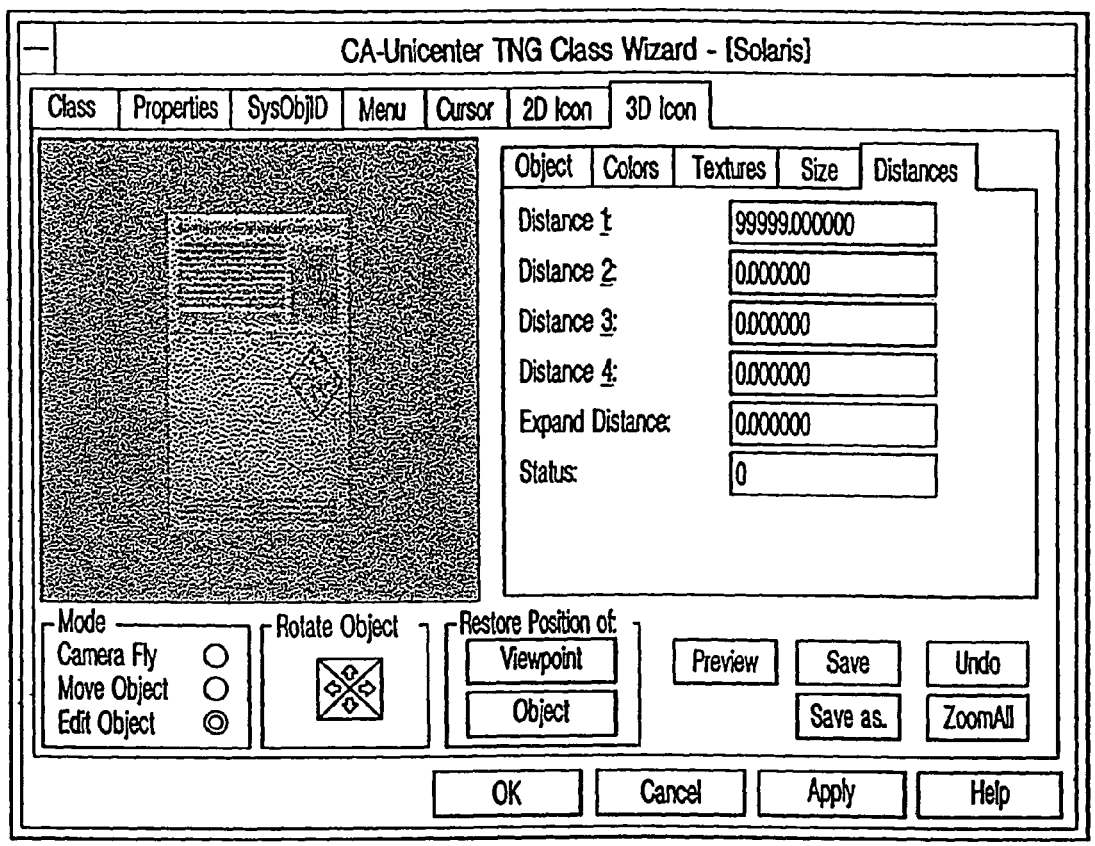
FIG. 10M illustrates the Distances Panel of the system presented in FIG. 10.
Figure 10N:
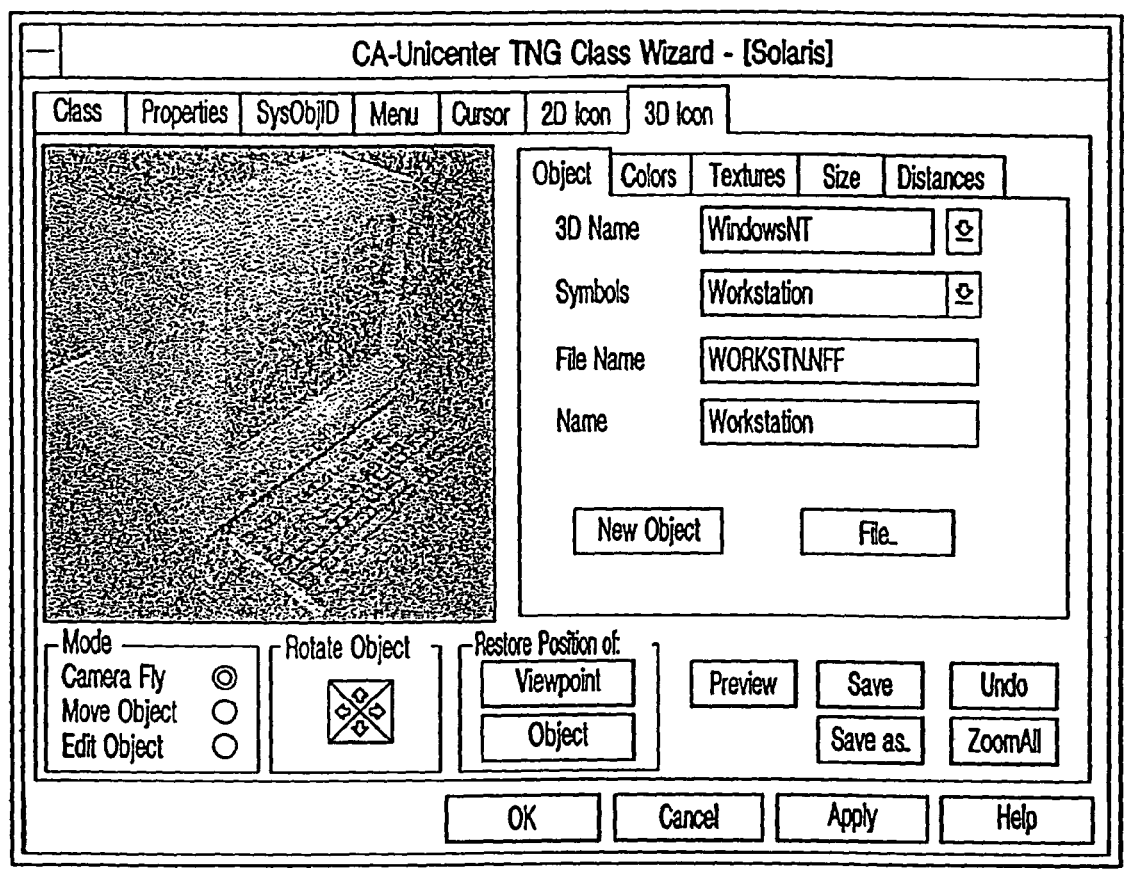
FIG. 10N illustrates the Object Panel of the system presented in FIG. 10.

The Distances view illustrated in FIG. 10M allows the user to specify the distances at which the different models are switched in, under the Level-of-Detail and Open-in-place modes of adaptive display. The interactive layout of network and devices over floor plans or other diagrams allows a customizing function by which the automatic layouts of logical networks can be shown in relationship to floor plans or other diagrams.

Dynamic Rescaling

Dynamic appearance, navigation and behavior during execution are provided by the current invention. Network connections are shown and various parts of the network are automatically rescaled as the operator moves through the realistic, 3-dimensional environment to get closer to the part of the computer-related units which are of interest. Network connections and indicator lights are initially shown large enough to be visible in the overview, but as a user travels in virtual reality, closer to a particular object, they unobtrusively shrink to take on a more reasonable size in the local view. This automatic rescaling does not continuously scale a network connection down to the actual size of a cable. The external view of the geographic space is the most severe scaling problem.

Automatic Navigation

Figure 9:
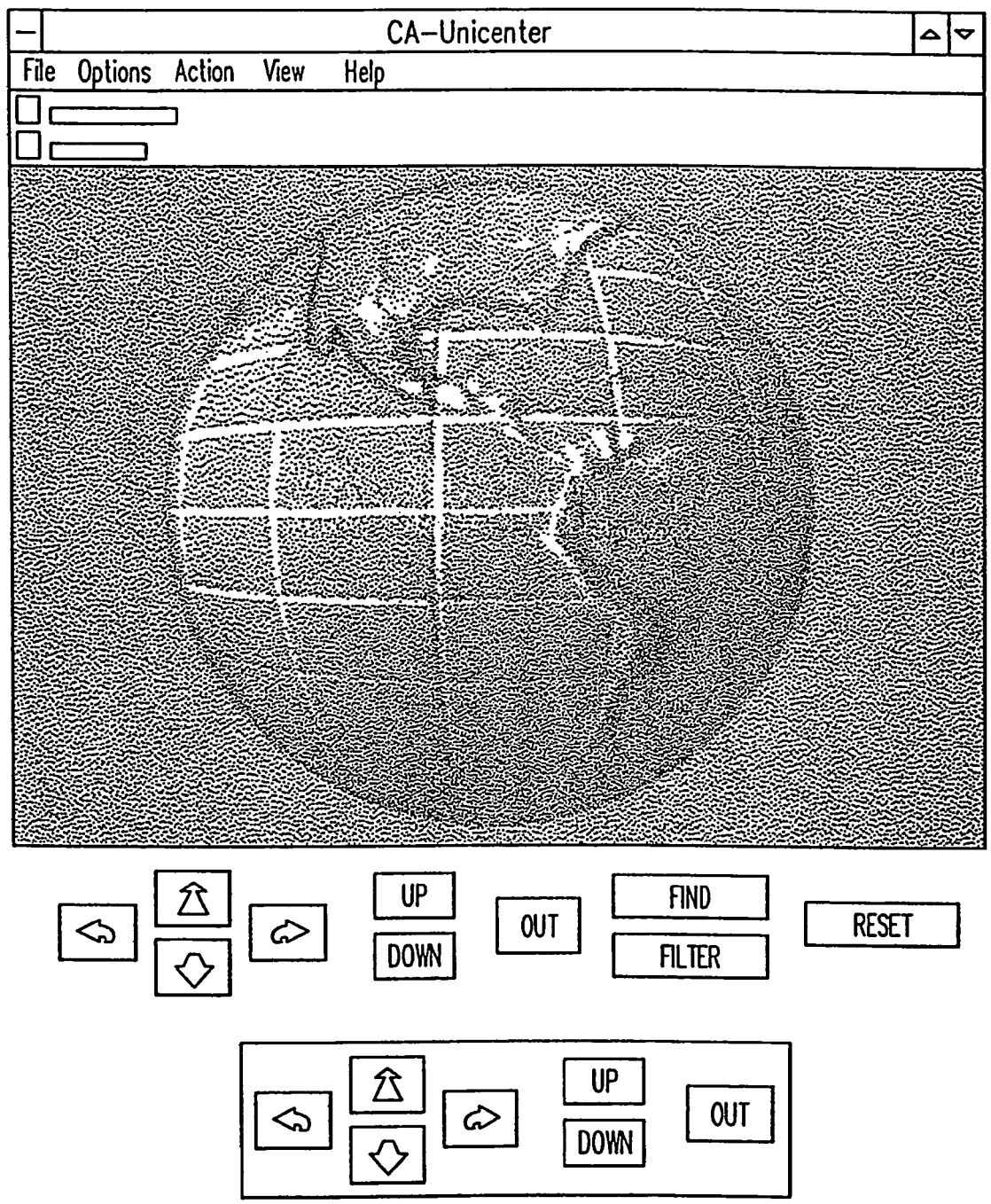
FIG. 9 illustrates the manual navigation control panel.

In the present invention, navigation occurs automatically by selection of a device in a 3-dimensional environment, in order to retain the illusion of residing in real environment. An automatic navigation control panel is provided as illustrated in FIG. 9. The system provides a "you are here" display, indicating the present location in terms of level of depth in the hierarchy and indicating the choices made to reach the displayed level. The navigation portion of the inventive system allows the user to select and to navigate to higher levels within the hierarchy. This automatic navigation includes automatic determination of a reasonable trajectory, avoiding collision with intervening objects such as buildings, and automatic determination of a reasonable speed and reasonable acceleration and deceleration that will take a separate amount of time for the user. The invention also provides for a history log and search windows using the user interface techniques well known in the computer industry. A history log will enable the user to view recently visited locations and quickly jump to a desired location. Search windows allow the user to search the network for the location of a particular unit, based on name, address, node ID or other properties (using well-known database search techniques).

When a GUI screen shows some important data, such as the event log which lists critical alerts, a "take me there" button automatically flies to the computer that originated the event.

The mouse provides "automatic flight" in a logical extension of the classical mouse operations. Moving the mouse over an object (without clicking) displays information about it, just like the prompts displayed by modern toolbars and other controls: this is the "targeting reticule." Clicking on an object means "take me there;" it makes the system travel to the object through a smooth flight path and halt in front of it (no disconcerting jump). Double-clicking on the object means "enter the object," as does a second click after the first travel. Right mouse-click brings up a local menu, common in modern GUI systems.

Manual Navigation

For manual navigation in 3-space, the preferred embodiment of the invention calls for a VR-type 6 DOF (degrees of freedom) control device, such as the Spaceball, that allows independent control of both position and viewing direction. Both allow control of movement in 3 dimensions (forward/back, left/right, up/down) as well as turning the direction of view (pitch, yaw, roll).

Manual flight, may be accomplished by use of a standard mouse with push buttons. The systems provides a control panel for manual flight under mouse control. While certainly less flexible than the 6-DOF devices, the control panel illustrated in FIG. 9 is quite useful especially in combination with automatic flight.

Figure 9A:
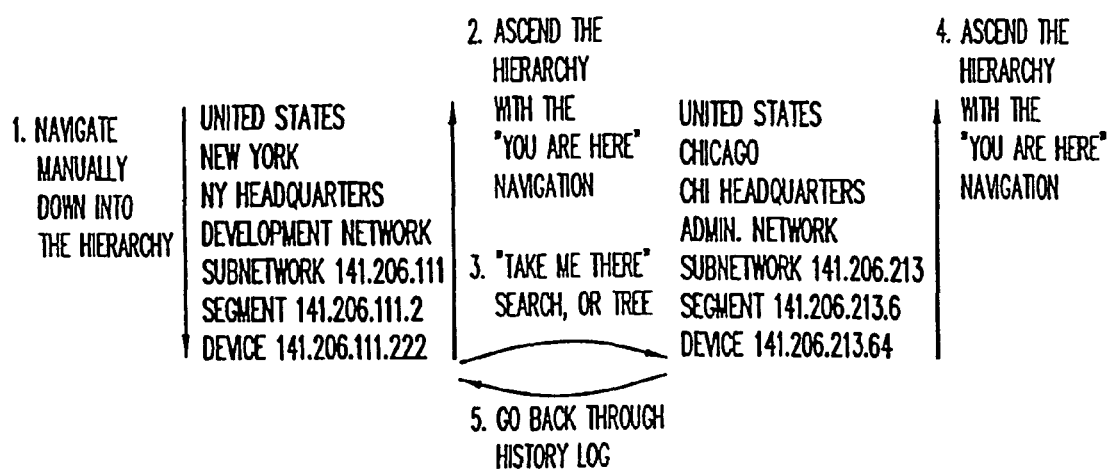
FIG. 9A is a diagram showing operational features of automatic navigation used in connection with manual operation.

Certain features of automatic navigation may be used after use of and in connection with manual navigation, and these features are illustrated in FIG. 9A. These features allow the user to navigate manually down into the hierarchy at a specific geographic location, to jump by a "take me there" request, by a search or by use of a tree structure, to a second geographic location. The user by manual navigation can ascend the hierarchy in either location with the "you are here" feature of the manual operation.

Continual Reporting

Continual reporting is provided by the present invention, including a status display of devices. The continual reporting function of the present invention is further achieved by the use of distributed originating-site filtering and the reduction of status display in the network.

Intelligent Aggregated Status Display

Figure 11:
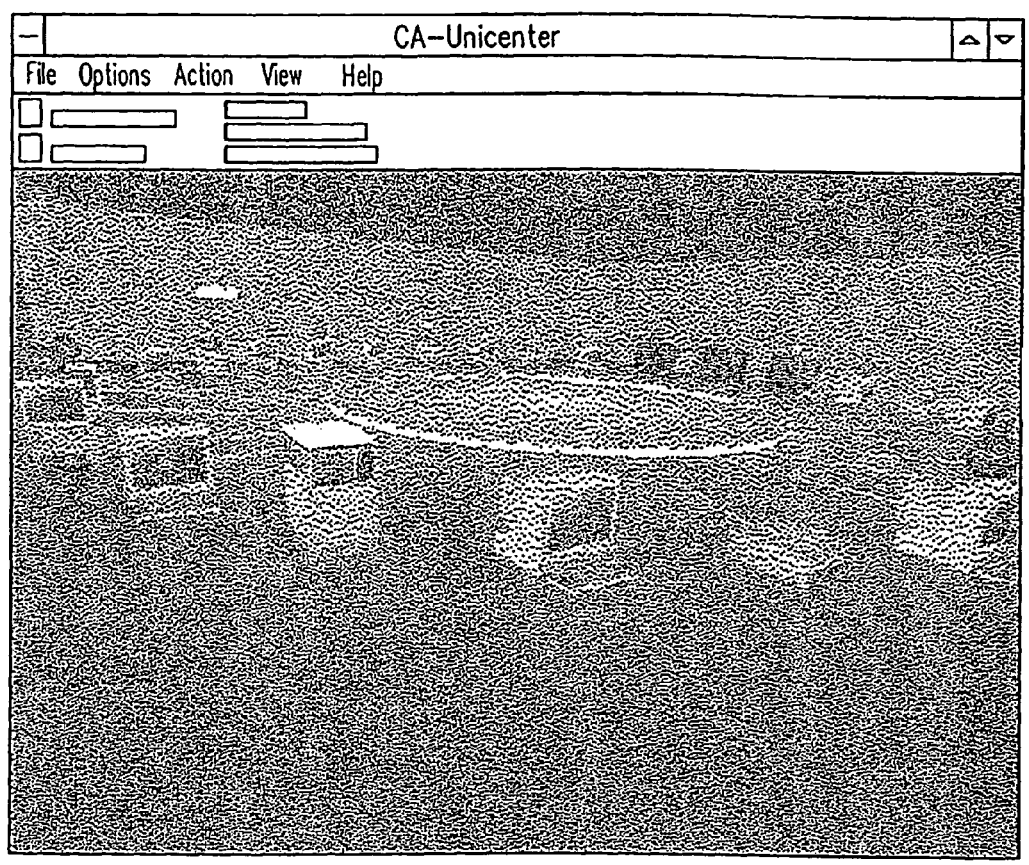
FIG. 11 illustrates the system with Status Display and a network scene.

The present invention provides a system that indicates the status of objects by use of colored indicator lights. The status reflects what is going on inside computers, operating systems, networks, disk drives, databases and critical processes. Such status indicators are aggregated so that network segments, subnetworks, buildings and cities reflect the status of what is in them. At the highest level, when traveling over the map, status indicators show the aggregate status for cities and buildings, in the form of globes that hover over the objects. This is shown in FIG. 11.

Only problems are indicated: to keep the scene simple, green lights indicating OK status are omitted. The aggregation is intelligent, weighing alerts based on importance, to avoid everything always showing red, a problem with early network management systems. The invention discloses that the view inside a building reflects the aggregate status of subnetworks, segments, and eventually the individual machines. Again, they are shown with hovering colored globular lights, and show only problem spots. Inside a computer, the systems show the status of components and subsystems. Our indicator shows the status of the computer itself, in terms of loading, process queue length, and number of users, while the status of its subsystems are indicated separately on each one.

Adaptive Disclosure

The inventive system utilizes several techniques to adapt the level of detail in the view to particular circumstances. This is necessary because of the performance and resolution limitations of today's hardware, and to make the display comprehensible to the user. Today's computer systems cannot visualize the thousands of computers in a country-wide network with adequate speed; even if it could, it would do little good because from 30,000 feet a computer is no larger than a pixel on the screen; and even if it were visible, the user would not want to deal with a large scene with thousands of objects in it.

The system uses three techniques to deal with this problem. First, the 3-D visualization uses the standard technique of "level of detail," where several models of different complexity are provided for each object. A distant object is rendered with the simplest model; as the user navigates closer, the system automatically substitutes increasingly complex and realistic models as resolution warrants. Second, certain aggregate objects such as a network segment automatically "open-in-place" to show their contents as the user gets closer, and are replaced with their closed external model again when the user moves away. Third, some complex objects remain closed and must be entered to show their internal components.

To avoid irritating flicker, the switching for "level-of-detail" and "open-in-place" are implemented with hysteresis, where the switching out distance is greater than the switching in distance.

The inventive system is fully configurable in that the user can specify which class of object can open in place or provide several models for "level of detail" display.

The user of the system can ignore this issue—when it is done well, it is unobtrusive, simply speeding things up—but it gives a system administrator an opportunity to tailor the presentation to the users' interest, to the system configuration and to the performance of available hardware.

Status Monitoring, Filtering And Aggregation

The present invention communicates with prior art technologies which continually monitor the operating status of all the components in the system: hardware and software, network and operating systems, databases and applications, network cards and disk drives. The results of the monitoring are then filtered according to preset threshold parameters and aggregated per the user's specifications.

Monitoring Agents/Open Architecture

The subsystems are monitored by independent agents on the managed systems; the agents report back to a manager whenever there is a significant status change, and possibly on a regular basis to signify that all is well. The invention provides customizable agents, but it also supports industry-standard protocols such as SNMP, allowing third-party software agents and hardware devices to be managed.

Filtering of Secondary Problems

Intelligent filtering allows the system to remove the noise, eliminating secondary problem reports when a fundamental problem has already been detected.

Aggregation

Although the agents monitor all the individual components, the system reports aggregate status for larger systems: for an entire computer, an entire network, an entire building, an entire country. The aggregation permits weighing factors, reflecting the reality that a database server machine is more important than an individual desktop machine.

Alternative Displays

The status of all components, from large aggregates like cities, buildings and networks to individual components like routers, computers, disk drives and databases, is displayed with the same principles in the virtual reality view, in the diagram view, or in the tree view.

Business Process Views

The present invention also visualizes information technology assets from a specific business perspective. The invention enables an isolated view of service levels, problems and administration for specific interests such as order entry and payroll. These business-oriented views of the assets in the network are based in groups. These are arbitrary groupings of things, groupings that make a specific business viewpoint. The user defines these groupings using simple drag-and-drop operations in the configuration subsystem, using standard GUI technology. The invention further permits the definition of any arbitrary grouping of computers, segments, subnetworks, routers, databases, and applications which may be assigned to a folder.

Business Process Filtering

Figure 8:
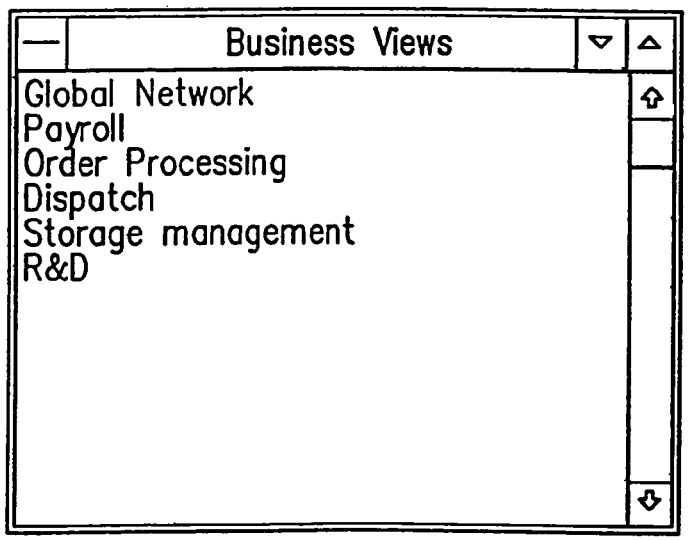
FIG. 8 illustrates the Business View control panel.

The system provides a separate control panel, illustrated in FIG. 8, that shows the aggregate service views (the user configures this panel, selecting the service view important and should be continually monitored). The services views have backlit buttons. The color of the backlit button represents the status of each business view.

The selected view becomes a filter for the system, one that addresses only those objects that exist within the selected service view; others simply disappear from view. This applies to all levels of hierarchy: if a city has no components related to that service view, or if a subsystem, a segment or a computer is not involved with the subsystem, they are not part of the business view; similarly, if a process or database is not used in an application inside the drive bay, it is removed and is not part of the business view.

Directly Visualizing Business Groups

It is also possible to group several computers, segments or subnetworks in a group and place this group in a building, at a subnetwork or segment to give the manager a perspective of the resources in the system that represents the physical connectivity of the network: it does not show which computers are connected to each other, but it groups computers or networks according to organization or project.

Control Panel

An information display control panel is illustrated in FIG. 7. The information display panel is configurable, like the other control panels; it may be turned on or off, and placed where it is convenient.

Display of Object Properties

The Real World Interface provides built-in search facilities that use an ordinary GUI screen, and provide immediate auto-flight, highlighting and filtering of specific objects. The Real World interface also automatically invokes the standard interface facilities for manipulation and control of the machine under focus or other objects (user ID's, installed software, files and backup media, etc.)

Multiple Views

The Real World Interface provides two additional views of the resources in the networks and the business groups: a two dimensional map or system diagram representing the system as connected icons, and a tree diagram representing the hierarchical structure of the network, These views are useful as navigation and search aids from the 3-D view. They are also robust enough to work as the main interface when using a low-end computer not capable of showing the 3-D view—for example, when logging into the system from home Manipulation and Control of the Managed System The Real World Interface invokes the standard GUI facilities for manipulation and control of the managed objects. Through a local menu, the user can bring up manipulation and control panels for each defect. From this panel, the manager can reach every management facility available for the targeted machine.

Extendabililty by API System (Open Architecture)

The inventive system provides an API system that allows the user to extend the interface and object capabilities of any part of the inventive system. The API system allows a new object to be added or a new class of objects to be defined in the object repository, information displayed in the targeting reticule to be modified, the user interface displays to be modified by conventional manipulation tools, or the colors for status indication to be changed. Menu options for the new object or class of objects can also be controlled.

Performance And Loading

In other embodiments, the present invention may provide a system that illustrates the amount of activity on disk drives, network cards, etc. by use of a blinking light, similar to the drive light on a real computer. The local agents then monitor the activity on the system, and report average loading. The system may be configured for different levels of timeliness, a typical setup might report statistics on a twenty-minute basis. Thus, the activity indicator shows what is happening with the system on an average basis.

C. Dynamic Operation of the System

The system of the present invention starts with a view of a typical system administrator's area of responsibility as a system manager—the entire earth—rotating before him or her. Next, the system opens up a world map.

From there, the user may navigate closer to an area of interest, either by flying with manual control, or with auto pilot: if the user clicks on the map the system will fly the user to the selected location.

As the administrator gets closer, he or she sees a relief map with cities and network connections. Again, the administrator can fly manually, using skills as if a helicopter pilot, or click on a city to get flown there by auto pilot.

Normally, all the cities, buildings and networks in the network are shown. To reduce the complexity, the administrator can activate a business view which shows only what is relevant to the specific business interest or problem of interest at any particular moment.

Eventually, as the administrator gets closer to a city, he or she sees buildings. Each city and building reflects the aggregate status of the systems inside it, in real time, by the status lights hovering over them. As the administrator flies into a building (or double-clicks on it) he or she sees, e.g., the LAN configuration inside the building or other network scene. This network scene shows the actual computers, printers, routers and bridges connected to the network: as soon as a new computer is connected to the network, it becomes visible to support discovery services and appears in this view immediately or after a regular refresh, depending on how the system is configured. The system reflects the entire network hierarchy, showing internetworks, subnetworks and segments. The user can fly around among the computers, identifying all resources and observing their status. The system shows computers, routers, printers and other devices as realistic models. The status of computers, components and software systems on a continual basis is available data.

If the administrator flies inside a computer (or double-clicks on it) he or she sees a view of the inside of it, with the relevant subsystems: a tape drive, the disk subsystem, the processor, the network card, and the aggregate of software processes and other software subsystems.

Entering a subsystem shows a view of what is going on inside it. For example, the software space contains processes; the system shows all of the monitored processes, displaying their real-time status, size, resource consumption, etc. The management system continually knows the state of the monitored processes (database management systems and other important servers) through the operation of agents on the target machine.

Similarly, the disk subsystem shows all the logical drives ("file systems" in UNIX terminology) known to the system, whether local or attached from a server. It shows their status, size and free space (shown through the targeting reticule). For remote drives, the administrator can easily navigate to the system that owns the drive. For local drives on a server that are attached from other machines, the administrator can easily get a list of the client machines and navigate to them.

Once in a computer, the user can enter each subsystem and inspect its properties and status in real time. Clicking on a subsystem such as a disk drive or a database brings up the standard GUI management facilities, giving the administrator direct access to both operational and administrative aspects.

Map Scenes

Figure 13:
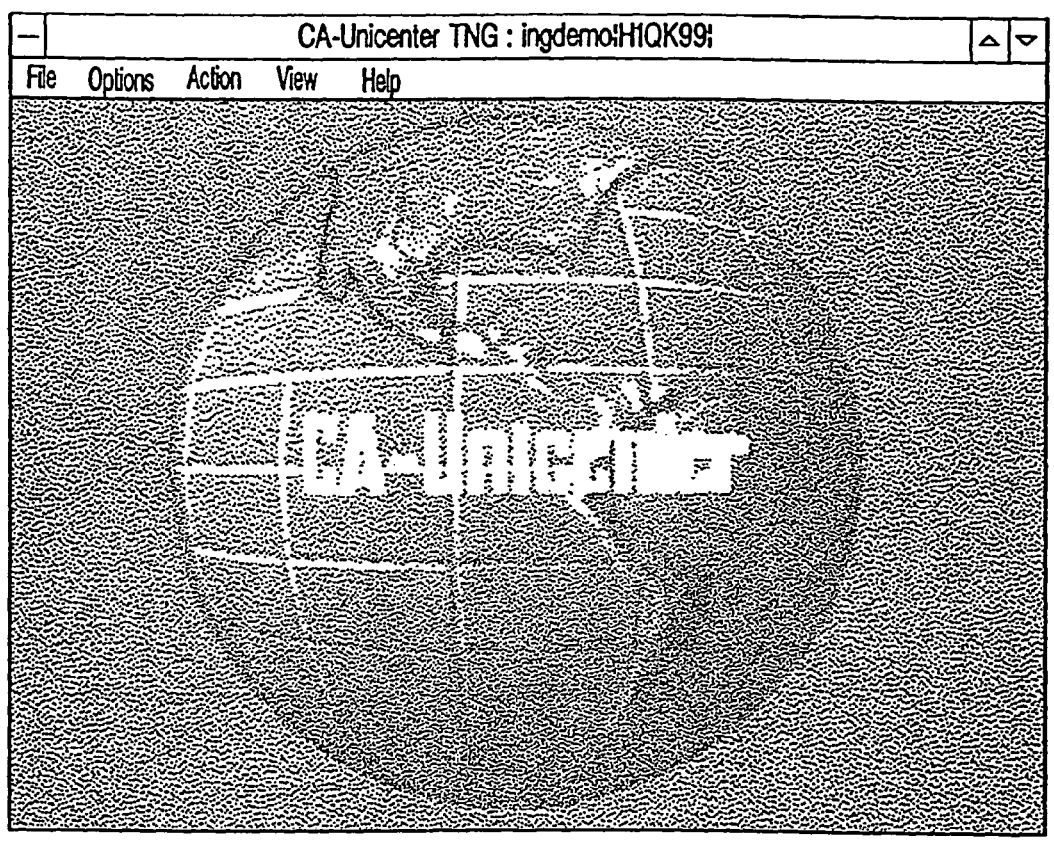
FIG. 13 is an example of a World View depiction.

The world map (as illustrated in FIG. 13) allows the administrator to check the area of interest.

Figure 14:
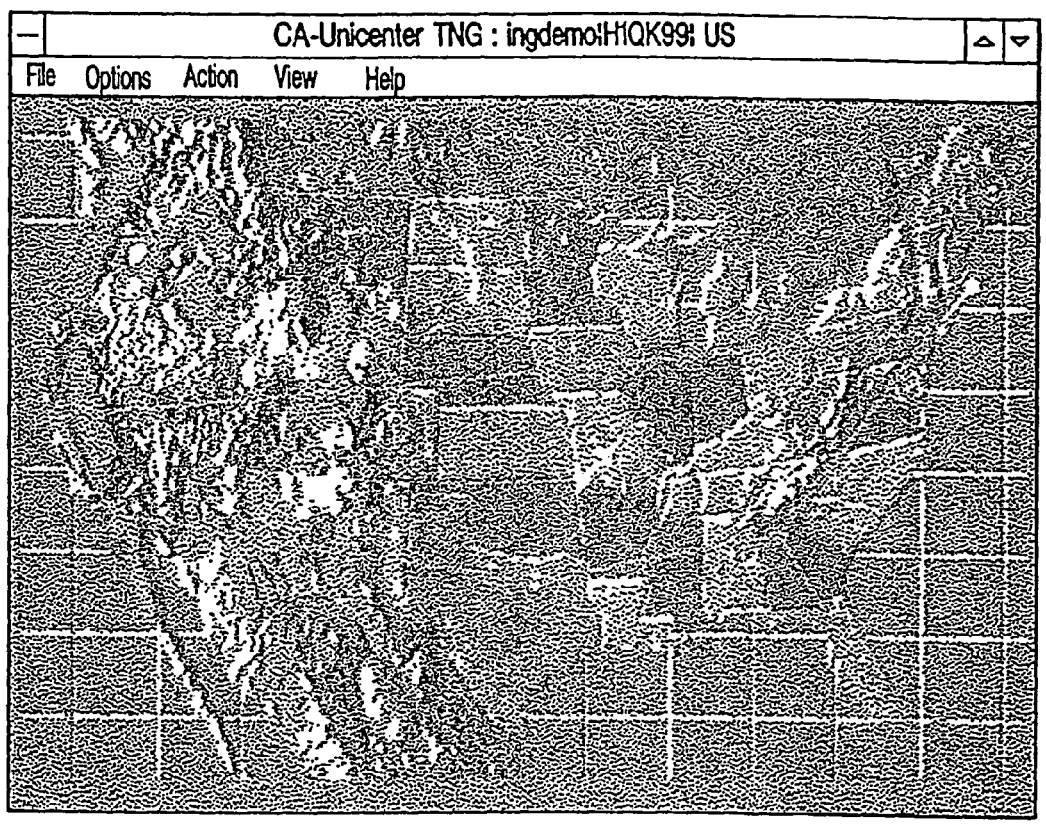
FIG. 14 is an example of a map scene depiction.
Figure 15:
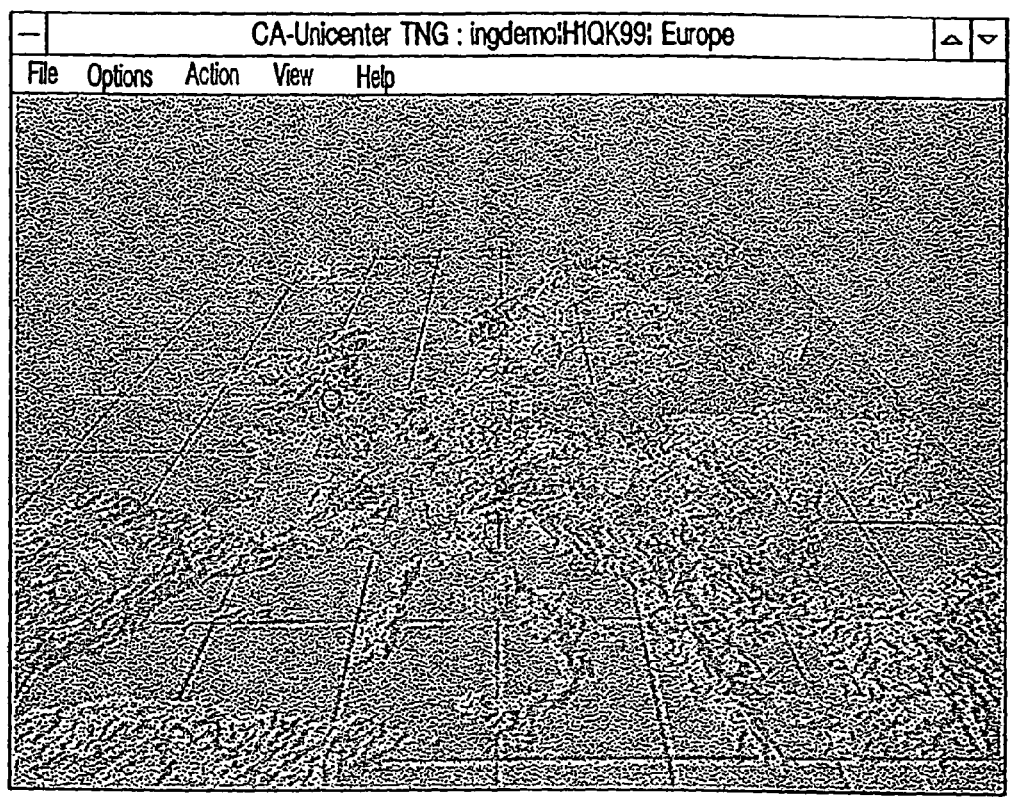
FIG. 15 is another example of a map scene depiction.

A map of each region (as illustrated in FIGS. 14 and 15) or continent shows the major cities and network links. The user controls how the network is displayed at this level, using the configuration tools: the user may want enough detail to be useful, but not so much that he or she drowns in network links.

Each "city" really represents a local region, which may contain several towns and cities. For example, the system may be configured so that "New York" includes New York City as well as Fort Lee and Newark in New Jersey, and "Boston" includes some of the Boston suburbs.

As the user gets closer to a certain region, a regional map with higher resolution and more detail is automatically inserted (an example of "Level-Of-Detail" display). These maps may be tailored to the user's particular interests, showing specific towns, highways or rivers as the user may prefer, by using the configuration subsystem.

Building Scenes

Figure 16:
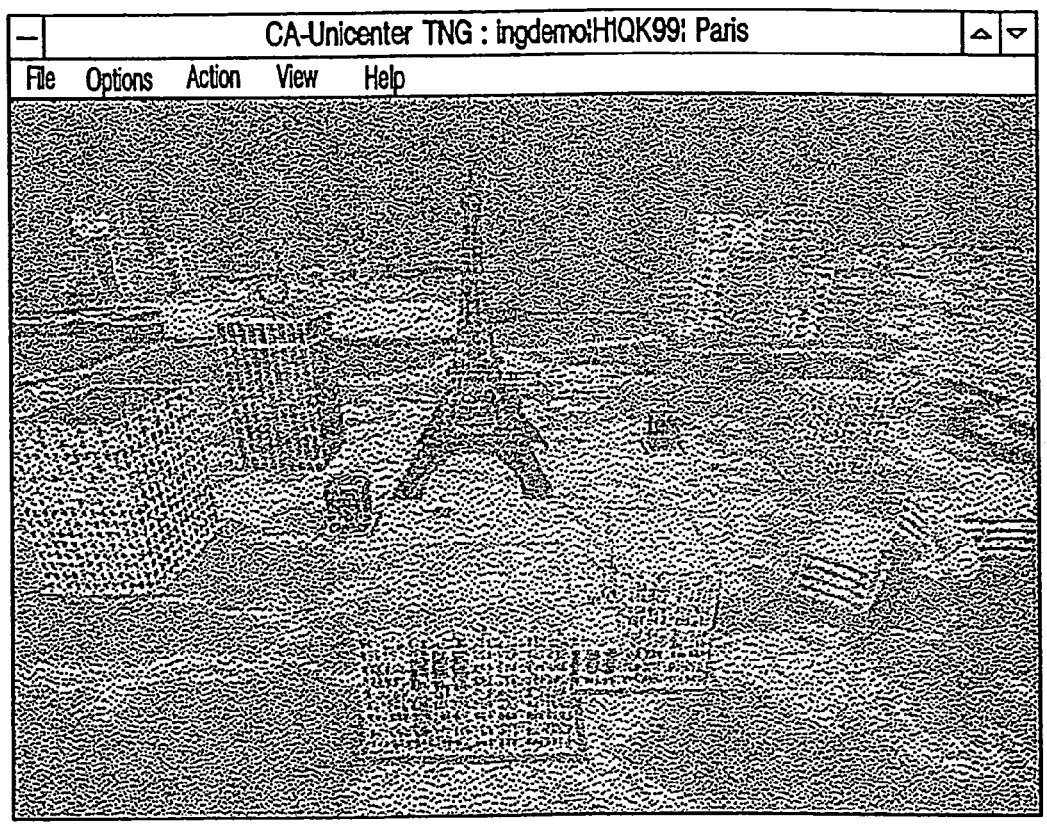
FIG. 16 is an example of a building scene depiction.

The city symbol is opened up to show the buildings (illustrated in FIG. 16) when the user gets close, while other cities remain as simplified objects. If two cities are close together (such as Los Angeles and San Diego), both may open up into buildings. The buildings are located at reasonable, user controllable positions, but the scale is not realistic; at a realistic scale, the buildings would be too small to see.

The system contains a number of standard building designs, but the user can enter custom designs using the configuration utility. This means a user can take photographs of its own buildings, feed them in as bitmaps together with a geometry design (basic dimensions), and make its buildings look like the real thing.

Network Scenes

Figure 17:
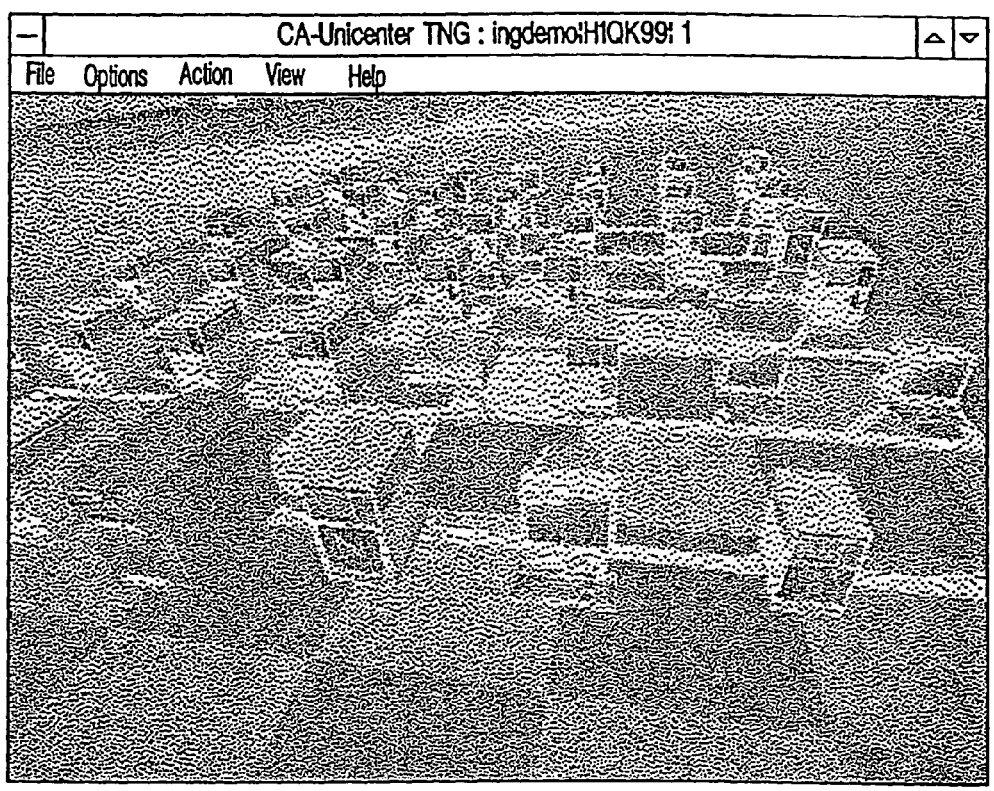
FIG. 17 is an example of a network scene with bridges and routers.

The system reflects the network hierarchy: the initial scene inside a building shows the various subnetworks and routers, when the user enters a subnetwork, he or she sees the various segments and bridges, and eventually sees the computers and other devices attached to the opened segments, as shown in FIG. 17. This is done for practical reasons: a horde of 2,000 computers is not manageable, nor can the computer render them effectively. The hierarchical network structure gives the user a way to select only the necessary information.

The subnetworks are connected by routers, and the segments by bridges—all of these are manageable devices, and their identity and status are shown.

The segments open up in place as the user get close to them, showing all the computers, printers and other devices. The visualization illustrates the structure of the network: a ring like Token Ring or FDDI, or a bus like an Ethernet.

The rendering is optimized by simplifying the computers that are far away, and automatically restoring the more precise representation as you get closer (another example of "Level-Of-Detail" display).

The system automatically generates a reasonable layout of the network and the computers. The user can also define the layout manually, using the 2-D layout and configuration utility. The user can provide a picture, for example a diagram of an office layout or a simplified campus map, for use as the floor instead of our standard tiles; this can help in using the system by associating subnetworks and computers with their physical location.

Device Scenes

The system knows how the different devices look: PCs, UNIX workstations, servers, mainframes, printers, routers, etc. The visualizations of the devices are very realistic, based on texture mapping (photographs pasted onto the 3-D models). The models are complete, even the backs of the devices look correct.

The database of physical models is maintained to reflect the common devices. As with buildings, the user can add new computer types by taking photographs of the machines (all the sides, including the back), scan the images, clean and simplify them, and define a new computer model with a geometry definition and these images.

Computer Interior Scenes

Figure 18:
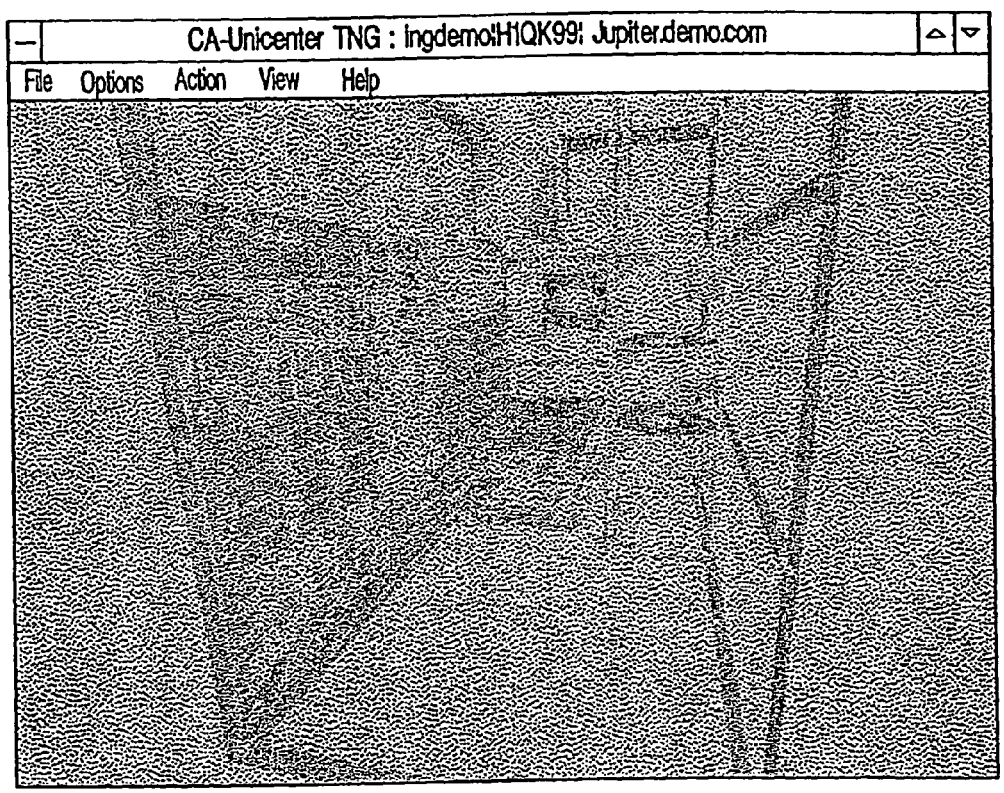
FIG. 18 is a depiction of component interior scenes.

Most of the components inside the computer are active: the CPU, the network card, the drive bay and the software space. All may be displayed in virtual reality view, as illustrated in FIG. 18.

Figure 19:
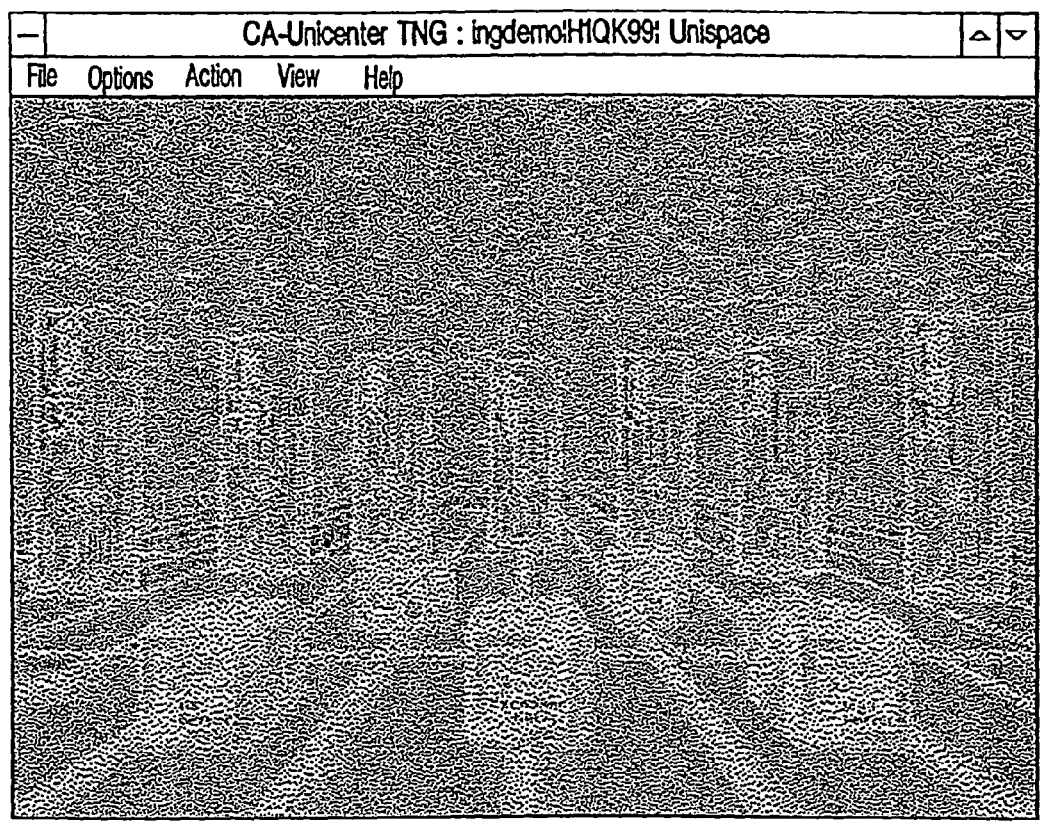
FIG. 19 is a depiction of software processes and other software subsystems in a computer.

Additionally, graphical displays of software processes and other computer processing activities are provided, as shown in FIG. 19.

D. Zooming Graph Diagram

Figure 20:
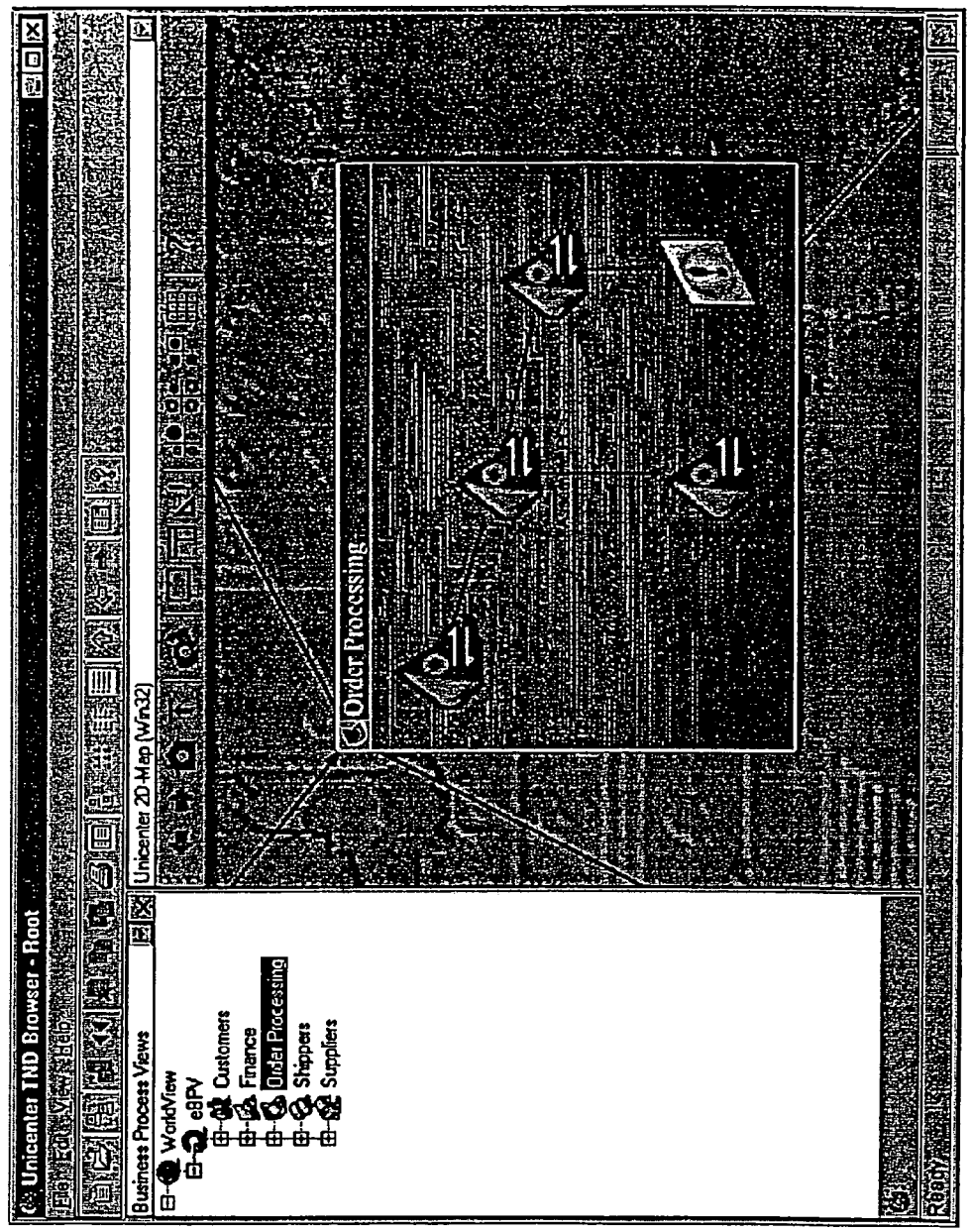
FIG. 20 is a screen display illustrating the zooming graph features of the present invention.
Figure 21:
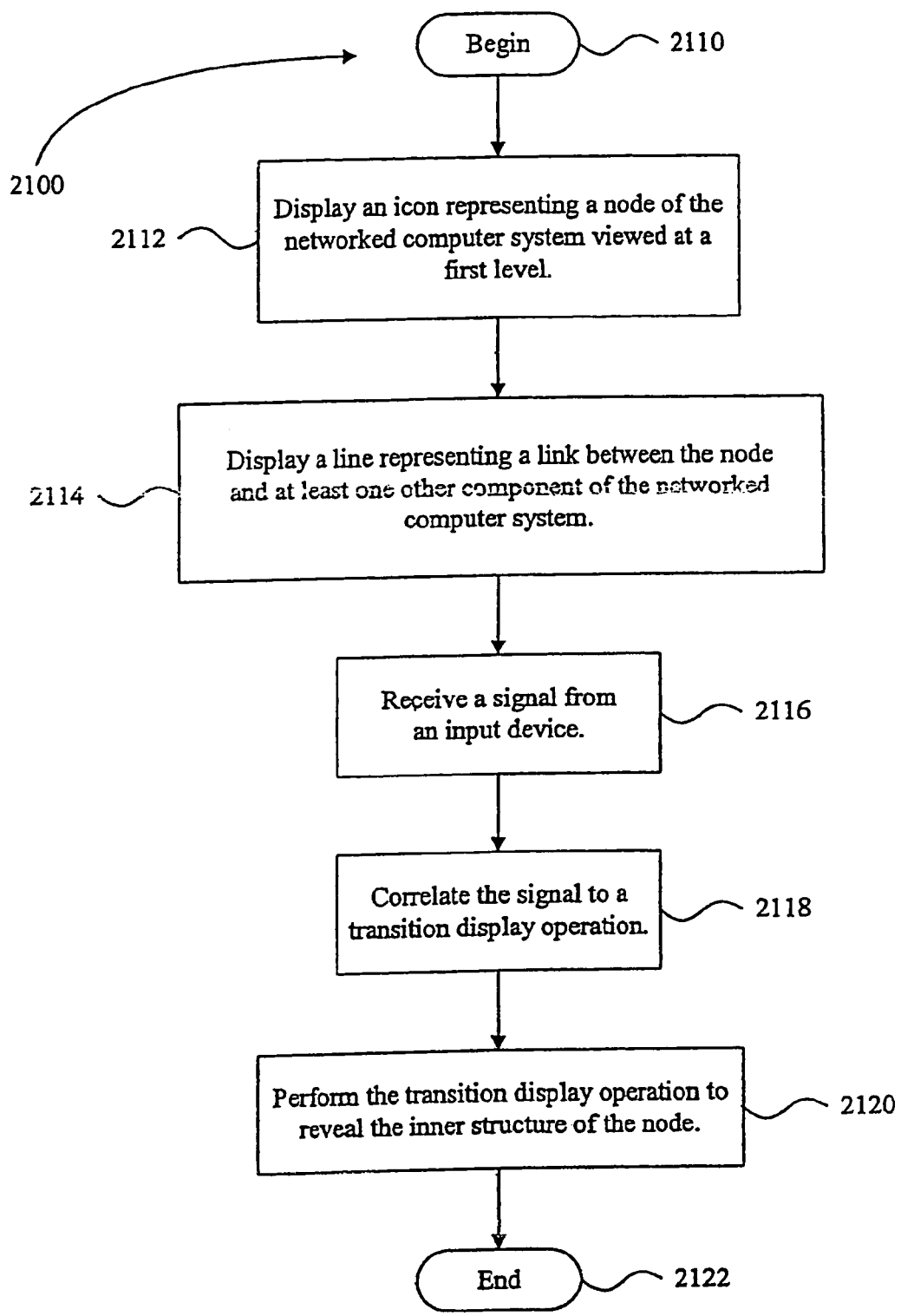
FIG. 21 illustrates a method for revealing the inner structure of a node, in accordance with the present invention.

The system combines the capabilities of two types of user interfaces, graph diagrams and continuous zooming, in a unique way. At the highest level, the elements of a system is represented as a graph diagram, with icons interconnected with lines. The user can seamlessly zoom into the diagram, and pan the diagram in any direction to make visible any part of the very large virtual space. As the user zooms in to the diagram, and the icons get larger, the icons are automatically replaced with their internal structure. FIG. 20 provides a illustrative screen display employing the graphical zooming and display techniques of the system.

Since the user interface represents a graph of interconnected objects, and not just a set of objects arranged on a desktop, the diagram may at any moment contain lines that connect the icons.

The inner connections in the contained graph structure appear as the user zooms in, and disappear as the user zooms out, just as the inner nodes do.

As is common in modern user interfaces, both the type and properties of the objects or interconnections may be represented visually, using graphical elements, coloring, annotation or animation.

Different types of graph structures are extremely common in computer systems and in any other field of human endeavor. The techniques employed by applicants' system apply to any data structure that may be represented as a graph.

In one implementation of the dynamic high-speed zooming feature, data for certain display elements, such as icons, may be stored in a database for association with specific data to be visually represented. In such an embodiment, the display element data may be retrieved from a local system or database or from a remote system or database, such as a remote server.

In such an embodiment, it is preferable if the data retrieval and graphic zooming operations may be executed asynchronously. In cases where the display data is retrieved from a remote system, this operational autonomy enables a workstation to seemlessly execute the zooming operation even if the data retrieval process is slow. For example, if a workstation has requested display data which has failed to arrive in a timely manner, the zooming operation may proceed without the display data, and present the display data whenever it arrives. This may be true even if the display data arrives during the zooming process.

Fade Effects During Zoom

When zooming in to a node, the contents of the inner structure can begin to be drawn as soon as the icon is larger than a few pixels; when the icon is very small, the representation of the inner structure is omitted. It is preferred to represent the node with a recognizable icon from a very small size up to a reasonable size, and only begin to show the internal structure when the icon gets larger than some threshold value. A recognizable icon is easier to understand than a minutely drawn diagram. Deferring the drawing of the internal structure until it is large enough to be useful also improves performance of the computer system, since the number of graphs that need to be rendered is limited to those that are visible within the computer display and are large enough to be useful.

In order to make the user interface easily understood and navigated, the transition from an icon to a diagram or other representation of the inner structure is made with a gradual fade-in effect. This ensures that the user retains a feel for the logical relationships among the objects.

Connecting Links To Internal Elements

When the user zooms into a node that has one or several links, the structure contained inside the node is shown in the user interface. The links that connect to the node may continue to be shown connected to the outer edge of the node, which is represented as the container of the inner structure. In many cases, the link that is shown connecting to the containing node is really connected to a specific node in the contained structure. For example, a network diagram may show a connection to a building, but when the user interface is zoomed in to show the various computers and other devices in the building, it is preferable to see the connection as going to a specific computer.

If the situation is reviewed in the other direction, a link that connects to an inner node inside a structure should, when the user interface is zoomed out to collapse the structure into a single icon, is converted to a connection to the icon.

In the system, as the user zooms in, the icon representing the node is transitioned to the containing diagram, preferably with a fade effect. At the same time, the link shown connecting to the node is adjusted to connect to the inner node.

If the icon is transitioned to the contained structure diagram through a fade effect, the link transition is also done with a continuous transition. If the inner structure is displayed without a fade effect, suddenly appearing as a replacement for the icon, then the link would undergo a similar sudden transition.

Consolidation of Connections

It is common in a graph that there may be several links between nodes in two structures that are consolidated into two icons at a higher level of the diagram. For example, if there are two buildings that each contain several computers, there may be several network links connecting pairs of computers in the two buildings.

When the user zooms out, reducing the two structures to two simple icons, the connections between the several pairs of inner nodes are represented as connections between the higher-level icons.

In some cases, it may be preferred to show all the connections, even on the higher level, to give the user a feel for the number of connections. This results in a number of parallel links.

In other cases, it may be preferred to consolidate the large number of connections into a single connection between the two higher-level nodes. This makes the user interface easier to read and understand.

In some cases, the various links at the lower level may represent different types of connections. In that case, it may be preferable to consolidate links of like type, while still showing several links between the higher level nodes, each representing one or several links of a specific type.

Such propagation and consolidation of links when ascending the containment hierarchy has not been employed in a system based on continuous zoom of nested graph structures.

Identification of Container Type, Name and Properties

When the user interface zooms into an icon and the icon is opened up into a diagram of the contained structure, it is of course possible to simply remove the higher level, containing icon and show the contained structure on the higher-level background surface. This reflects the essence of the containment situation: the contained graph is merely a graph within the larger structure.

In many cases, however, it is useful to render the container in such a way that the containment relationship is visually identified, and the nature and identity of the container are obvious. To this end, when an icon is opened to show its contents, it is converted to a container very much in the style of conventional windowing systems: it has a title bar with the name of the container, with an icon in the upper left corner identifying the type of the container.

In addition, it is often useful to show properties of the container. For example, in network management applications, it is common to indicate the status of an object by coloring it red, orange or yellow. When the icon is expanded into a container, it is of course possible to color the entire container, but such a dramatic rendering may be counter-intuitive, since it emphasizes the red status for larger containers over smaller ones. Instead, in the applicants' system, the status of the container is usually indicated by coloring the title bar. Other properties may be indicated through other icons or colorizations on the container or title bar.

Although a rectangular container is the most common, it is often very useful to draw the container as some other geometric shape, such as a triangle or circle.

Background Maps

To help the user recognize the type, identity and properties of a container, the system can draw a background image when the container is opened. Such a background image can represent the opened object in the form of an enlarged version of the icon, a logo, or whatever visual effect is considered suitable. The background image may be specified using any type of graphical file, including bitmaps, vector files, HTML or other types of graphics.

In some cases, it is desirable to use as the background an image that identifies locations. This might be a street map or a building floor plan, for example. In these cases, icons in the contained structure may be placed on the background map in the correct place. Placements may be made manually, through drag-and-drop techniques, or by entering some coordinate that identifies a location: latitude and longitude, street address, zip code, phone number, or office or cubicle number.

While certain placement techniques have been implemented in the past, applicants' system is the first system to combine this technique of physical placement on a background map with the continuous zoom and pan capability. This makes the use of such placement considerably more useful, since it permits the detailed placement and yet retains the larger perspective of where the whole container is. This is useful both when the maps on two different levels of the diagram are based on a similar map and when they are different, such as a building's floor plan contained within a logical network diagram without physical representation.

High Production Values in Graph Diagram User Interface

Applicants' system uses advanced rendering techniques with anti-aliasing, tinting, translucency and other effects to make the diagram legible and attractive during the continuous zooming. This is in contrast to conventional graph diagramming user interfaces that have used traditional graphics techniques, which work well enough at a fixed size or at integral zoom factors, but they do not render well when the system supports continuous zoom.

To make clearer the overlay structure of containers on the background, the system uses drop shadows to delineate the different layers of the nested diagram. To make this visual effect unobtrusive and yet effective, the system uses a translucent shadow with a blurred edge. Although these techniques are of course well known in graphics processing systems, but have never before been employed in a user interface designed for managing graph structures.

Translucency of Background Surfaces

In some cases, a connection may pass underneath a container. In classical graph rendering user interfaces, the line just disappears under the container and reappears at the other end. This make the diagram difficult to read.

In the applicants' system, using the advanced rendering technology discussed above, such a line is faintly visible through the slightly translucent background of the container.

Adaptation to Limited Computer Power

Applicants' system automatically adapts itself to the observed performance of the computer. If the update frame rate during zooming and panning are deemed insufficient, the system disables effects such as anti-aliasing, translucency and background maps while there is large-scale motion in the display, and re-renders them once the display has stabilized. Although on many modern computers, there is ample processing power to render the advanced visualization effects in with acceptable performance even during dynamic behavior such as zooming, experience shows that responsiveness is critical to a pleasing environment.

Carefully Managed Dynamics

In any graph diagramming user interface, there will be different techniques for navigating. The user can manually zoom and pan, using the mouse in combination with various key sequences on the keyboard: for example, Ctrl+drag up and down might zoom the display, while space bar+drag might pan the display.

It is also common in such user interfaces to provide various forms of automatic navigation. For example, double-clicking on an icon usually opens the icon and displays its contents; a button on the toolbar steps up one level in the containment hierarchy, collapsing the current graph into an icon in another graph.

In applicants' system, the corresponding operations are done through automatic zooming of the diagram in or out.

To make the behavior of the user interface pleasant and easily understood, the dynamic behavior of the visual effects are carefully tuned. For example, when the diagram is automatically zoomed in or out, the speed of the effect is gradually increased up to a maximum zoom speed, and then gradually decreased down to zero; the entire transition is timed to be visual but not dizzying.

To aid in panning, the system supports "tossing" the diagram in one direction, by making a rapid dragging gesture with a mouse. The diagram glides along and gradually slows to a stop under the effect of simulated friction; if it hits the edge of the large virtual space, it bounces back.

User Rearrangement of Layout

When rendering a graph structure as a diagram of icons and lines, the arrangement of the icons and lines on the diagram surface can have a large impact on the clarity and impression of the diagram. The system arranges the symbols in different structures by, among other things, making a best guess in choosing the most suitable arrangement, depending on the structure of the diagram. The system also allows the user to choose another layout mode, or to switch to manual mode and arrange the layout by dragging icons on the surface.

The system can be used in a collaborative environment, where several users view a shared database. However, an individual's rearrangement of diagram layouts are considered personal, and do not affect other users of the system. To ensure that the user will see the same diagram layout regardless of which physical computer he or she uses to view the information, the personal layout specifications are stored in the shared database, identified as belonging to the user.

Opening or Closing Individual Nodes

The standard description of a data structure like the one used here, a containment hierarchy of nested graphs, emphasizes the fixed hierarchy. This is one reason why conventional systems for visualizing graph structures have been based on explicitly opening and closing individual graph windows. In some cases, however, the user may prefer to blur the level of the hierarchy when viewing the data structure.

For example, when viewing a network diagram that has several computers in Chicago connected to several computers in New York, a user may want to see those individual computers and the links between them. At the higher level, the diagram shows only an icon for Chicago and New York—and between them, several other icons for cities like Detroit and Buffalo. When zoomed in to show the individual computers, the containers for Detroit and Buffalo would also be visible and take up so much space in the middle of the diagram that the contents of Chicago and New York would not be simultaneously visible. Since the user is not interested in Detroit and Buffalo, it would be preferable to either hide those containers, or show them collapsed to icons as they were on the higher level diagram.

Thus, the user may prefer a hybrid diagram that mixes symbols from different levels.

Applicants' system permits individual containers that are open at one level to be closed to icons, at which time the other content of the diagram is rearranged to take advantage of the freed space. Further, the system allows a closed icon to be expanded in place into an open container, at which time the other content nudges aside to make room for the newly opened container.

User Restructuring of the Hierarchy

In most cases, the containment hierarchy of a system is implicitly defined by the semantics of the data, or explicitly defined by a system administrator. Since such a containment hierarchy may carry meaning that makes it significant for processing of the data, rearranging the hierarchy is not done lightly.

However, to make the most sense for an individual user, it might be useful to be able to rearrange the structure of the diagrams. For example, a network administrator may look at a network segment which contains 250 interconnected computers, all of which are semantically meaningful terms. However, the administrator may want to focus the majority of his or her attention on the 25 servers running business processing, and may not be very interested in the 225 desktop machines running Windows 98. In a conventional graph diagramming user interface, all the less relevant computers clutter up the display, making the important servers or other components of interest hard to see.

While using the system, an individual user may select an arbitrary set of computers, using standard desktop metaphors such as dragging a rubber rectangle or Ctrl-clicking with the mouse, and group them into an ad hoc container. This container may then be collapsed into an icon. This embodiment allows a user to moves the less relevant computers (or other components) out of the way, without losing the link to them.

Filtering

A graph diagram can easily become cumbersome because of sheer data overload. Since graph diagrams typically reflect the physical reality or some other data structure driven by other processing, there may be so many objects that the diagram is difficult to read. Further, many of these objects may be irrelevant to a specific user at a particular time. To address this, the system provides filtering techniques, which can be used to hide objects in the diagram temporarily based on their type, status or other property value.

The system provides a filtering technique based on the inclusion of objects in an arbitrary user-defined container. For example, a manager may define a group that contains only those systems that are relevant to his or her activities. The diagramming system can be set to show only those objects that are included in such an arbitrary grouping. The filtered diagram can then be used with the features described herein for the system of the present invention.

Shortcuts

A user of the system may want to include a reference to an object in a particular container, although the object may be located in another container. For example, in a container that includes all the servers that make up a web site, it might make sense to show an icon representing a mainframe used by the web servers, even though the mainframe is correctly shown in another container.

The system permits the addition of references to other objects at any point in a diagram. Such icons, which represent the referenced object, may be interconnected in the diagram and in general treated like any regular object.

Combination With Tree Control

Although the zooming graph display feature described above permits arbitrary navigation through a very large structure, there are times when it may be preferable to use other techniques for navigation. For example, for a quick jump to another known location, clicking in a conventional tree control may be preferable.

In addition, the nested graph diagrams give an excellent view of the local context, but it may be difficult to identify the current location within the larger context. For this reason, the graph diagramming display may be supplemented with a "you-are-here" display.

With applicants' system, both of these needs are met by a tree control that is kept synchronized with the graph diagram. As you navigate in the nested graph diagrams, the tree controls show where you are; and if you select a node in the tree control, the diagram is automatically navigated to that location. The tree control may be shown or hidden, at the user's discretion.

You-Are-Here Display

Another useful navigation tool is a small thumbnail map of the entire virtual space, indicating the present position with a small rectangle. This "you-are-here" map also permits navigation by dragging the rectangle on the map.

This technique is known in graphics systems, but has never before been applied to a continuous zooming and panning graph diagram display such as applicants' system.

Application of Hyperbolic Tree User Interface to Network Management

Unicenter TND uses a novel application of the known hyperbolic tree visualization technique to address the problem of navigating network links or other relationships in a network.

Since there are so many types of links among the various objects represented in a network graph, the hyperbolic tree is extended with a selector that allows the user to specify what type of link is to be included in the hyperbolic tree.

Filtering of nodes based on type, property values or membership in other containers can further simplify the diagram.

The status of nodes and links, and other property values such as volume of traffic, is represented in the hyperbolic tree in the form of color or icon choice.

The nodes and links in the hyperbolic tree represent real objects in the network. The network management system provides a large number of operations that can be invoked on an object, when the objects are represented in standard user interface tools such as regular tree controls and list boxes. It is an essential feature of applicants' system that those same operations are available in the hyperbolic tree as well, presented as items on a context menu, main application menu, keyboard sequences or other standard user interface techniques.

Dynamic and Self-Configuring Visualization Framework

In conventional systems, a particular representation is employed by a graphical user interface based on knowledge of the data to be represented. For example, a network diagramming system has a lot of programming logic referring to the structure of networks in the graphics component.

For simpler representations, such as tree and list browsers, generic visualization tools do exist. However, even for those tools, the specifications for how the information is to be visualized are held either in the graphics code itself or in a database or registry on the machine where the visualization is done.

Both of these techniques are inconvenient, because they make it difficult to reuse the graphics tools to visualize new data that resides on a remote computer. Such new data may be data that has not been previously considered to be in the domain of the graphics tools, as well as data considered to be in the domain of the graphics tools. Applicants' system provides a general and dynamically reconfigured visualization tool that takes its specifications for how the data is to be represented from a possibly remote data provider, and that provides sophisticated visualization.

Architecture

The system relies on a data retrieval infrastructure that permits visualization of such new data.

The system provides objects, sets of objects, associations (relationships or links) between the objects or sets of objects, and self-documenting data (e.g. metadata) so that data from relational infrastructures can be visualized. As an example, a tuple, such as a single row in a relational database, can be viewed as a degenerate object, and that a row set, such as a set of rows in a relational database, can be viewed as a set of degenerate objects. Thus, data from relational infrastructures can be visualized.

It should be noted that foreign key relationships among tables in a relational database are a form of association contemplated by the present application.

Although relational systems meet these requirements, many other, more general systems meet the requirements as well. In particular, it is common that data is represented as a graph of interconnected objects, which cannot be conveniently or efficiently represented as a table.

In the preferred embodiment, applicants' system is based on an infrastructure described in more detail in Provisional Application Ser. No. 60/131,019 filed Apr. 26, 1999 which is incorporated herein by reference.

The visualization tools in this infrastructure contain a general visualization framework, which provide a number of visualization techniques:

A 2-D graph diagramming tool that provides for navigation of nested and interlinked structures through continuous zoom and pan A 3-D visualization tool that displays the information in the form of realistic or stylized 3-D environments and provide navigation within the environment.

A hyperbolic tree visualization tool that makes it convenient to navigate in very large and bushy graph structure conventional tree controls, list boxes, spreadsheets and property sheets.

In addition, the visualization framework supports the construction of visualization plug-ins. Although this plug-in architecture may of course be used to build data-specific visualization tools, that is not the purpose of applicants' system; rather, it is intended that such plug-ins be built in the same way as the general visualization tools provided with the system, configuring themselves automatically from data.

In addition to the regular metadata, which allows the visualization framework to dynamically construct property sheets and tables, the architecture is based on the data providers delivering visualization specifications in the form of hints added to the general metadata.

These hints may specify, for example, where the icon or 3-D model for an object is to be found. The hint may specify the icon directly, it may specify that a class-level property holds the icon for all objects of a certain class, it may specify that an object-level property holds the icon for each object, or it may specify that a property holds a set of icons and which one is to be used depends on another property (such as status).

The hints may be very detailed. For example, for a successful 3-D visualization, the hints may specify several external models to be used at different levels of detail, as well as an internal model, a floor texture, and specialized characteristics such as the radius used for collision detection.

The hints may specify one or more types of associations used to represent the containment hierarchy used in trees, diagrams and 3-D views, and one or more types of associations that can be shown as links in those diagrams.

And finally, the hints may specify menu items that are to be displayed on context menus for each class of object, and the path to the method that implements each menu item.

With this infrastructure and these extensive hints supplied by the information provider, the visualization framework can represent any data that meets these very broad requirements in a number of very sophisticated ways.

Variation: External Hint Provider

In some instances, an information provider may not have the visualization hints that are needed for the proper workings of the visualization framework, and it may not be convenient, permitted or possible to extend the provider with visualization hints.

In such instances, the framework permits the specification of an external provider of visualization hints for an information provider.

Under applicants' system, the person responsible for providing the data can provide the visualization hints and place them at some convenient location, near the data provider or elsewhere, but without having to distribute them to thousands of systems.

E. Neugent

Software Architecture for Providing Neural Network Analysis Services to Remote Computers Neural network technology is a powerful tool for solving many types of problems. The basic mathematics of neural network technology are well understood.

Applicants' system provides a convenient way of connecting neural network technology to common applications, regardless of the programming language used, and regardless of the location of the user interface, the data source or the processing resources required by the neural network.

Architecture

The system of the present application can be configured with a neural network processing service that is connected to a remote access mechanism. The remote access mechanism can be any object request broker, such as CORBA or Microsoft's DCOM. Preferably, the infrastructure described above and in Provisional Application Ser. No. 60/131,019 is utilized.

The neural network service provider is configured as a class. When using the services, the client application creates an instance of the neural network class. This instance holds the properties that define the task of the neural network, and also holds the model that the neural network generates after training. The instance is persisted by the neural network provider in some type of data store. The provider can use any conventional persistence mechanism, including SQL and a regular file system. In the preferred embodiment, the provider uses the object database of the preferred infrastrucure.

The application performs these tasks:

Instantiate a neural network object which automatically persists its information;

Depending on what type of problem is to be solved, specify some small number of parameters;

Tell the neural network object where its training data is, and tell it to start training; and Tell the neural network object where its consulting data is, and consult it.

Neural networks can be used to do different types of analysis, and to address these different needs. In one embodiment, the system uses three different classes of neural networks:

Value prediction

Event prediction

Cluster analysis

The different types of neural network objects require different parameters. For example, value prediction requires specification of which fields are to be predicted (the "outputs").

Some parameters are optional. For example, value prediction normally assumes that all fields that are not outputs are inputs, but the application program may optionally list the input fields specifically, implying that those that are left out are to be ignored. Wherever possible, all properties are optional, with reasonable values assumed.

One reason for using a neural network is providing the data for training as well as consultation. Since the neural network features can be used for many diverse functions, a way to increase the efficiency of the neural network technology is to permit an application program to specify the path to the data; so that the neural network retrieves the data when it needs it, using the data retrieval infrastructure it is connected to. This removes the need to move data to the location of the neural network.

It is common in modern architectures to have the client with the user interface on a system separate from the database server that holds the data. But since training a neural network may be demanding of computing resources, it is preferred that the architecture allows efficient invocation of the neural network when it is placed on a third system, separate from either client or data server. And in this case, it is also preferred that the neural network retrieves the data directly from the data server, without requiring that it is passed through the client.

Similarly, after the neural network object has been trained, and the created model has been persistently stored, the application consults the neural network in the same way: it specifies the location of the data, and the target path for placing the results, and asks for a consultation.

In some cases, however, the consultation data may exist in the client application already, after having been entered by the user. To support such situations, the system permits consultation from a collection of data objects passed in as arguments.

Neural networks may also be used to predict events. In this case, the data source is presented the same way as in the value prediction case, but the result is an event, not a set of predicted values. The system uses the infrastructure to send the predicted events, using the standard event propagation mechanism.

COMPLIANCE WITH EXAMINER GUIDELINES FOR COMPUTER RELATED INVENTION

In regard to its practical application, the present invention makes a substantial contribution to and advancement of the practical industrial arts in that it allows the user to use a visualization workstation to monitor and control remote portions of a networked computer system, using a real world interface while also providing two dimensional graphical displays and other tools. It allows comprehensive management of all resources on the network. Views and data relating to a specific business interest of particular concern to a user may be selected for viewing. The present invention is user customizable. Finally, it is generally applicable and extendable to any equipment or system with computing and agent communication capability.

The present invention does not fit within any of the per se nonstatutory subject matters categories: it is not functional descriptive material such as data structures or a computer program listing, is not nonfunctional descriptive material such as various literary copyrightable works, and is not a natural phenomena in the realm of pure science.

The present invention comprises an inventive combination of software and hardware. Specifically, this application comprises a Virtual Reality (VR) Workstation(s) and Object Repository Server communicating and controlling the enterprise client-server system via a TCP/IP or other connections. The VR Workstation requires an advanced processor of at least an Intel Pentium® 586 processor, a 3-D accelerated video board with OpenGL support, and at least 32 MB of Random Access Memory (RAM). The software portion of the preferred embodiment uses Windows NT as an operating system in both the VR Workstation and Object Repository Server. The Object Repository includes a database for maintaining the status of the enterprise client-server system. The present invention thus is a product (machine or manufacture) for performing a process and is thus statutory.

The present invention, to the extent that it comprises a series of steps to be performed on a computer, is a process that manipulates data representing physical objects (e.g., inventory if selected on the business interest) and activities on the networked equipment being monitored to achieve the practical application discussed above. The inventive process also performs independent physical acts after computer processing by presenting practical views to the user on the visualization station monitor. The inventive process does not merely manipulate data without any practical application. Thus also as a process the present invention is statutory.

The foregoing inventive system and apparatus has been described generally and with reference to preferred and other embodiments. Those skilled in the art, upon reading of the specification, will understand that there are equivalent alterations, modifications and embodiments including systems that monitor, control, administer, and manage systems that may not be labeled "networked computer systems" but which substantively are networked computer systems. The present invention includes systems to administer all networked computer systems, however labeled, and includes all such equivalent alterations and modifications.

What is claimed is:

1. A method for displaying a diagram of at least a portion of a networked computer system, comprising:
   displaying an icon representing at least one component of the networked computer system viewed at a first level;
   displaying a link representing a relationship between at least one of the components represented by the icon and at least one remote component of the networked computer system viewed at the first level;
   receiving a signal from an input device;
   correlating the signal to a zoom operation; and
   performing the zoom operation, including gradually increasing a zoom speed from zero to a predetermined maximum zoom speed and back to zero during the zooming operation.

2. A method for displaying a diagram of at least a portion of a networked computer system, comprising:
   displaying an icon representing at least one component of the networked computer system viewed at a first level;
   displaying a link representing a relationship between at least one of the components represented by the icon and at least one remote component of the networked computer system viewed at the first level;
   receiving a signal from an input device;
   correlating the signal to a transition display operation;
   performing the transition display operation, including determining if the signal is correlated to a transition display operation that is a continuous zoom operation that increases a zoom speed from zero to a predetermined maximum zoom speed and decreases the zoom speed back to zero during the continuous zoom operation; and
   performing at least one predetermined advanced rendering technique of anti-aliasing, tinting, and translucency if the signal is correlated to the continuous zoom operation.

3. A method for displaying a diagram of at least a portion of networked computer system, comprising:
   displaying an icon representing at least one component of the networked computer system viewed at a first level;
   displaying a link representing a relationship between at least one of the components represented by the icon and at least one remote component of the networked computer system viewed at the first level;
   receiving a signal from an input device;
   correlating the signal to a transition display operation;
   determining if the signal correction to a transition display operation that continuously zooms until the icon is converted to a container; and
   performing the transition display operation, including gradually increasing a zoom speed from zero to a predetermined maximum zoom speed and decreasing the zoom speed back to zero during the transition display operation.

4. The method of claim 1, wherein:
   displaying an icon comprises displaying a three-dimensional icon; and
   displaying a link comprises displaying a three-dimensional link.

5. The method of claim 1, further comprising:
   displaying a first representation symbolizing a geographic area; and
   displaying a second representation symbolizing a building.

6. The method of claim 5, wherein:
   displaying the icon comprises displaying the icon within the second representation symbolizing a building; and
   displaying the second representation symbolizing the building comprises displaying the second representation symbolizing the building within the first representation symbolizing a geographic area.

7. The method of claim 5, wherein displaying the second representation symbolizing a building comprises:
   receiving a picture of an actual building; and generating the second representation symbolizing the building based on the picture.

8. The method of claim 2, wherein:
displaying an icon comprises displaying a three-dimensional icon; and
displaying a link comprises displaying a three-dimensional link.

9. The method of claim 2, further comprising:
displaying a first representation symbolizing a geographic area; and
displaying a second representation symbolizing a building.

10. The method of claim 9, wherein:
displaying the icon comprises displaying the icon within the second representation symbolizing a building; and
displaying the second representation symbolizing the building comprises displaying the second representation symbolizing the building within the first representation symbolizing a geographic area.

11. The method of claim 9, wherein displaying the second representation symbolizing a building comprises:
receiving a picture of an actual building; and
generating the second representation symbolizing the building based on the picture.

12. The method of claim 3, wherein:
displaying an icon comprises displaying a three-dimensional icon; and
displaying a link comprises displaying a three-dimensional link.

13. The method of claim 3, further comprising:
displaying a first representation symbolizing a geographic area; and
displaying a second representation symbolizing a building.

14. The method of claim 13, wherein:
displaying the icon comprises displaying the icon within the second representation symbolizing a building; and
displaying the second representation symbolizing the building comprises displaying the second representation symbolizing the building within the first representation symbolizing a geographic area.

15. The method of claim 13, wherein displaying the second representation symbolizing a building comprises:
receiving a picture of an actual building; and
generating the second representation symbolizing the building based on the picture.

16. The method of claim 1:
further comprising upon finishing the zoom operation, displaying at least a second icon representing at least one component viewed at a second level different than the first level;
wherein if the zoom operation is a zoom-in operation, performing the zoom operation comprises zooming into the icon representing at least one component of the networked computer system viewed at a first level to display the second icon viewed at the second level; and
wherein if the zoom operation is a zoom-out operation, performing the zoom operation comprises zooming out from the icon representing at least one component of the networked computer system viewed at a first level to display the second icon being viewed at the second level, wherein the first icon is within the second icon.

* * * * *